United States Patent
Gates

(10) Patent No.: US 7,689,386 B1
(45) Date of Patent: Mar. 30, 2010

(54) AUTOMATED DUCT WORK DESIGNER AND LAYOUT ENGINE

(75) Inventor: Travis Gates, St. George, UT (US)

(73) Assignee: G & G Ventures, LLC, St. George, UT (US)

( * ) Notice: Subject to any disclaimer, the term of this patent is extended or adjusted under 35 U.S.C. 154(b) by 588 days.

(21) Appl. No.: 11/183,600

(22) Filed: Jul. 18, 2005

(51) Int. Cl.
*G06F 17/50* (2006.01)
*G06G 7/48* (2006.01)
*G06F 19/00* (2006.01)
*G01M 1/38* (2006.01)

(52) U.S. Cl. ............. 703/1; 703/7; 700/97; 700/145; 700/165; 700/182; 700/276

(58) Field of Classification Search ............ 700/182, 700/276, 97, 145, 165; 703/1, 7
See application file for complete search history.

(56) References Cited

U.S. PATENT DOCUMENTS

| | | | |
|---|---|---|---|
| 4,551,810 A * | 11/1985 | Levine | 700/182 |
| 4,847,778 A | 7/1989 | Daley | |
| 6,116,888 A * | 9/2000 | Johnston et al. | 425/195 |
| 6,131,077 A | 10/2000 | Normann et al. | |
| 6,662,144 B1 | 12/2003 | Normann et al. | |
| 6,701,288 B1 | 3/2004 | Normann et al. | |
| 2002/0077059 A1 * | 6/2002 | Rutler et al. | 454/289 |
| 2003/0074164 A1 | 4/2003 | Simmons et al. | |
| 2003/0084766 A1 | 5/2003 | Massaro et al. | |
| 2003/0208341 A9 * | 11/2003 | Simmons et al. | 703/1 |

OTHER PUBLICATIONS

Carmel Software—Duct Size 6.0, http://64.147.171.146/carmel/software/Software_Details.aspx?id=3&page=0, Dec. 12, 2005.
HVAC Solution, http://www.hvacsolution.com, Dec. 12, 2005.
Autodesk, http://usa.autodesk.com/adsk/servlet/home?siteID=123112&id=129446, Dec. 12, 2005.
Mech-Q HVAC Ducting, http://www.asvic.com.au/ducting.html, Dec. 12, 2005.

* cited by examiner

*Primary Examiner*—Kidest Bahta
*Assistant Examiner*—Nithya Janakiraman
(74) *Attorney, Agent, or Firm*—Austin Rapp & Hardman

(57) ABSTRACT

A new type of method and system for designing duct work is disclosed. This system may be implemented using a computer. The system may be designed such that specific information regarding the room, the appliance, and/or other information is input into the computer. Using this input information, along with information that is stored in a database, the system will output a design for the duct work that may include both a cut sheet (for cutting out the duct work) as well as a three-dimensional representation of the duct work that is displayed on a computer.

1 Claim, 14 Drawing Sheets

AUTOMATED DUCT WORK DESIGNER AND LAYOUT ENGINE

TECHNICAL FIELD

The present invention relates generally to a system and method that may be used to design duct work for use in conjunction with a heating or air conditioning unit. More specifically, the present invention relates to a system and method that uses a computer to easily and readily design duct work.

BACKGROUND

Heating and/or cooling systems are a standard feature of most houses and buildings in the United States. The purpose of these systems is to maintain the house/building at a fixed temperature. Thus, during the winter months (or other periods of cold weather) the system will heat the building, whereas during the summer months (or other periods of hot weather), the system will cool the building. By maintaining the building at a desired temperature, the heating/cooling system makes the building safer and more pleasant for the occupants.

Generally, heating/cooling systems will comprise a large unit that is designed to heat/cool the air. These units will be referred to herein as Heating, Ventilation, and Air Conditioning units ("HVAC units"). HVAC units may include a "central air" system, a heat pump, a furnace, an air conditioner, a heater, etc. Often, in most modern systems (such as central air systems), the same HVAC unit is capable of providing both heating and cooling to the house/building. However, systems in which the heating unit is separate and distinct from the cooling unit are also known and widely used.

Because the HVAC unit is often a large unit, it will often be placed in an area that is "out of the way." Thus, many HVAC units are installed in basements, furnace rooms, closets, storage rooms, attics, etc.

As is known in the art, the house/building will usually include vents or ducts that run to all areas of the house/building. Such vents are generally positioned under the floor, in the wall, in ceiling, or in other areas so that they will not detract from the overall interior décor of the building. The purpose of these vents is to channel/carry the heated/cooled air from the HVAC unit to all areas of the building. Thus, by having these vents, all areas of the building can be heated/cooled by the HVAC unit, not just the furnace room or area surrounding the HVAC unit.

In order for the vents to carry the air from the HVAC unit, the vents have to be connected to the HVAC unit. Such a connection between the HVAC unit and the vents is usually accomplished through a "fitting" or, as it is sometimes called, "duct work." The specific piece(s) of duct work that is required for each building will depend upon a variety of factors including the size and type of the vents, the size and type of the HVAC unit, the size of the room that stores the HVAC unit, the location of the air supply that feeds the HVAC unit, etc.

Because this duct work is a custom-made piece, skilled professionals are generally needed to construct and design the fitting. Generally, this process will involve having the professional take measurements of the room, the appliance, the vents, etc. Using this information, as well as information obtained from the particular HVAC unit, the skilled professional can then design and plan out the size and specifications necessary to create the custom-made duct work piece.

Duct work is generally formed from a standard-sized sheet of metal (such as tin and steel). Accordingly, in order to make each custom-made piece of duct work, the skilled technician must generally put together a blueprint or design sheet which indicates how the standard-sized metal sheet should be cut, folded, etc. to form each specific duct work piece. These design sheets are generally referred to as "cut sheets."

Once the cut sheet has been created, the skilled professional may, using the information outlined on the cut sheet, cut the standard metal sheet into the proper design for the duct work. Such cutting of the metal sheet is occasionally done on an expensive cutting device known as a plasma machine or a plasma cutter.

Because the process for creating a custom piece of duct work is so labor intensive, it is ripe with error. Such errors occur both in designing the duct work as well as in cutting out the duct work piece. Often skilled professionals make mistakes when they are creating/forming the custom-made duct work piece. Of course, these types of errors mean that the duct work design process may be very inefficient and often results in wasted time, resources, and money.

Accordingly, it would be beneficial if a new type of method and system for designing duct work could be developed that is efficient and cost-effective. Such a system and method is disclosed herein.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
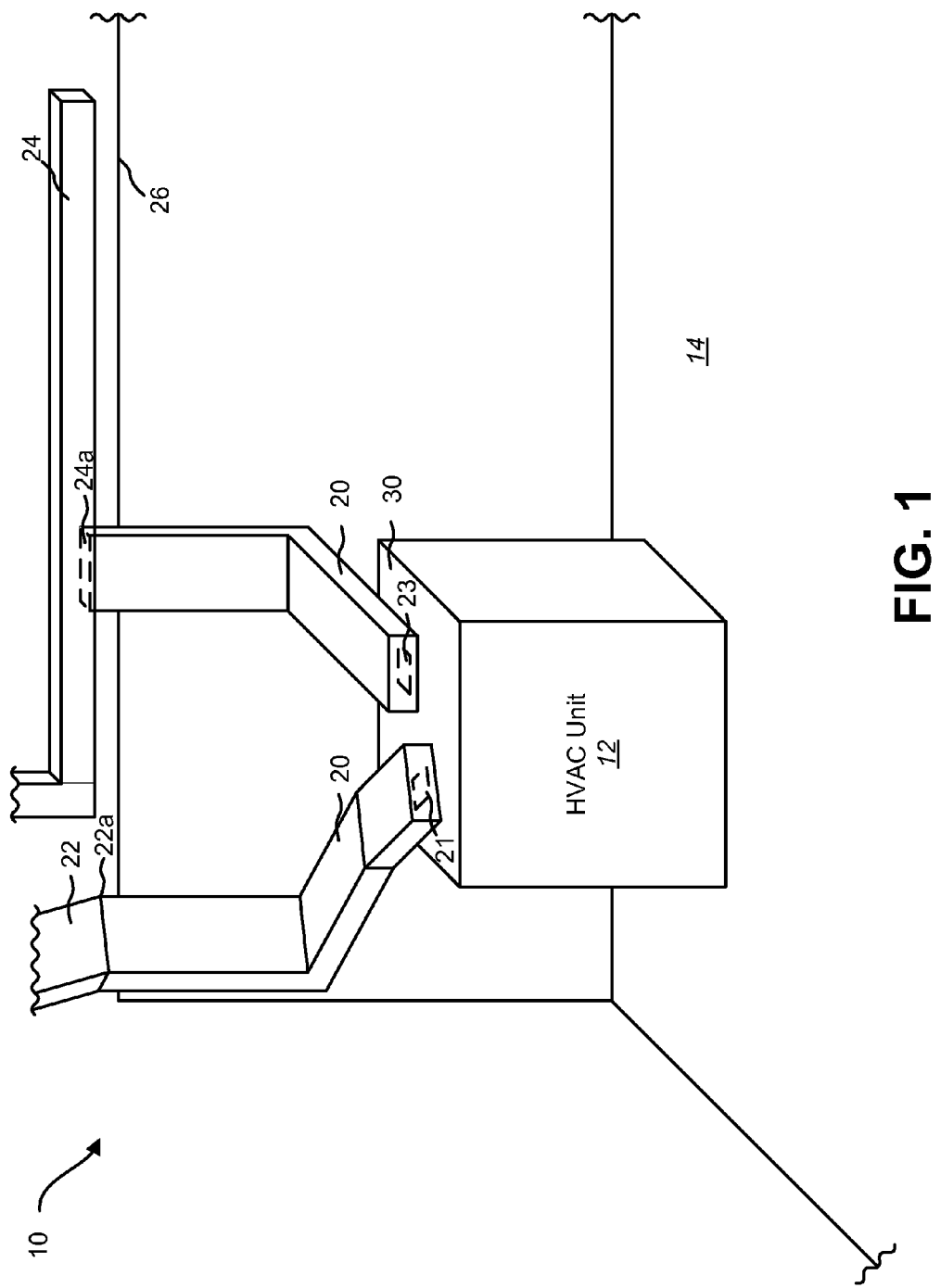
FIG. 1 is a perspective view of a room that contains a heating and air conditioning unit as well as duct work that may be designed according to the present invention.

A method for designing duct work using a computer is disclosed. In this method, input information is received. This input information will include the manufacturer and model number of the appliance with which the duct work will be attached, the dimensions of the room in which the duct work will be installed, and the location of the room supply port and the room return port in the room. This input information will also be processed. Using this processed information, as well as a fitting factory, a duct work design will be created. Once the duct work design has been created, a two-dimensional cut-sheet containing the duct work design will then be output.

In some embodiments, this method for designing duct work is implemented on a computer that is remotely accessed by a client computer via a computer network. Other embodiments may be designed such that the above-recited method is performed on a computer and is used to retrofit duct work for an existing HVAC unit and an existing room.

Additional embodiments may be constructed in which, in addition to the above-listed information, additional input information is received. This additional input information may be log-in information, fitting information, appliance information, or room information. In yet further embodiments, the input information may be supplied to the system by a user answering questions that are supplied by the system.

Embodiments may be designed in which a three-dimensional representation of the duct work design is also output by the system. Likewise, additional embodiments may be made in which the created duct work design is output to a cutting device.

As noted above, the method of the present embodiments will generally be accomplished by having the input information be processed. It should be noted that, in some embodiments, such processing of the input information may be accomplished by obtaining the location of appliance ports and the room ports. In yet other embodiments, such processing of the input information is accomplished by obtaining the specifications of the appliance ports and the room ports. It still further embodiments, this type of processing the input information is accomplished by extracting other information from a database.

Further, as noted above, the method of the present embodiments will create a duct work design using the processed information and a fitting factory. In some embodiments, creation of this duct work design will involve calculating the size of one or more fittings, calculating the length of the fittings, calculating the shape of the fittings, requesting the fittings from the factory, receiving the fittings from the factory, and evaluating and making adjustments to the duct work design based upon the information received from the factory. Of course, in other embodiments, creation of this duct work design will involve creating a collection of fittings, determining which fitting is next using a set of rules, requesting the fitting from the fitting factory, receiving the fitting from the factory, adding the fitting to the collection, and evaluating how the addition of the fitting has changed the collection.

The present embodiments also include a computer-readable medium having executable instructions for implementing a method for designing duct work. This computer-readable medium will implement a method that will receive input information. This input information will include the manufacturer and model number of the appliance with which the duct work will be used, the location of the room supply and the room return to which the duct work will be connected, and the dimensions of the room in which the duct work will be installed. As part of the method, the input information will also be processed. Using this processed information, as well as a fitting factory, the method will also create a duct work design. Once the duct work design has been created, the method will output a two-dimensional cut-sheet containing the duct work design.

The present embodiments may also provide an apparatus for designing and laying out duct work. This apparatus includes a processor, an input/output device in electronic communication with the processor, and memory in electronic communication with the processor. In the memory will be stored various specifications for duct work. The apparatus will also include instructions for implementing a method for designing and laying out duct work. As described in greater detail above, this method will have input information received by a system. This input information will include the manufacturer and model number of the appliance with which the duct work will be used, the location of the room supply and the room return to which the duct work will be connected, and the dimensions of the room in which the duct work will be installed. As part of the method, the input information will also be processed. Using this processed information, as well as a fitting factory, the method will also create a duct work design. Once the duct work design has been created, the method will output a two-dimensional cut-sheet containing the duct work design.

Various embodiments of the invention are now described with reference to the Figures, where like reference numbers indicate identical or functionally similar elements. It will be readily understood that the embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are shown to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

An embodiment of a system and method for designing duct work is disclosed. This system may be used to design and/or lay out duct work that may be installed in a room. Specifically, FIG. 1 is a perspective view of a room 10 containing an HVAC unit 12 (which is represented graphically as a box). The HVAC unit 12 is positioned on the floor 14 of the room 10, although other embodiments may have the unit 12 positioned on a shelf, etc. As noted above, the HVAC unit 12 may be a furnace, an air conditioner, a "central air" system, a heat pump, or any other device that is capable of providing heating and/or cooling to a building.

As is known in the art, the HVAC unit 12 is designed such that air may flow in and out of the HVAC unit 12. Accordingly, heated/cooled air will leave the HVAC 12 unit through the air exhaust port 23. As in known in the art, the air exhaust port 23 is often referred to as the "appliance supply" 23 in that the exhaust port 23 is "supplying" air to the building.

Once the air leaves the appliance air supply 23, this flow of air will be channeled, via duct work 20, to the venting 24. As is known in the art, the venting 24 consists of ducts, pipes, or other channels through which air may be channeled to other parts of the building, as desired. As shown in FIG. 1, the venting is positioned in the ceiling. However, other embodiments may be constructed in which the venting 24 is positioned in the floor, the walls, etc.

As shown in FIG. 1, the duct work 20 connects the appliance air supply 23 to the venting 24. Of course, a hole or opening is added to the venting 24 so that air can flow from the duct work 20 into the venting. Generally, this opening in the venting 24 that connects to the duct work 20 is referred to as the "room supply" 24a because through this opening, the HVAC unit 12 will be able to "supply" the room or building with the heated/cooled air.

In order for the HVAC 12 to function properly, a supply of air must be fed into the HVAC unit 12. (Once the air is inside the unit 12, this air may then be heated or cooled.) Accordingly, the HVAC unit 12 will also include an inlet port or "appliance return" 21 so that air can enter the unit 12. This port 21 is referred to as the appliance return because through this port, air may "return" from the building to the appliance.

The appliance return 21 must also be connected to a venting system 22 that channels air into the room/HVAC unit 12. The opening through which this quantity of air will flow is referred to as the room return 22a. This opening is called the "room return" in that air returns to the room via this vent 22. Again, this room return 22a may be positioned in the ceiling, the floor, the wall, etc. As is known in the art, another piece of duct work 20 is used to attach the room return 22a to the appliance return 21.

As shown in FIG. 1, the HVAC unit 12 is designed such that the appliance return 21 and the appliance supply 23 are positioned on the top 30 of the HVAC unit 12. Other embodiments may be constructed in which the appliance return 21 and/or the appliance supply 23 are positioned on the front or back (or on other locations) of the HVAC unit 12.

As noted above, the design and production of the duct work 20 is difficult and time consuming. Accordingly, the present embodiments provide a system that designs the duct work 20 so that it may be more easily produced.

Figure 2:
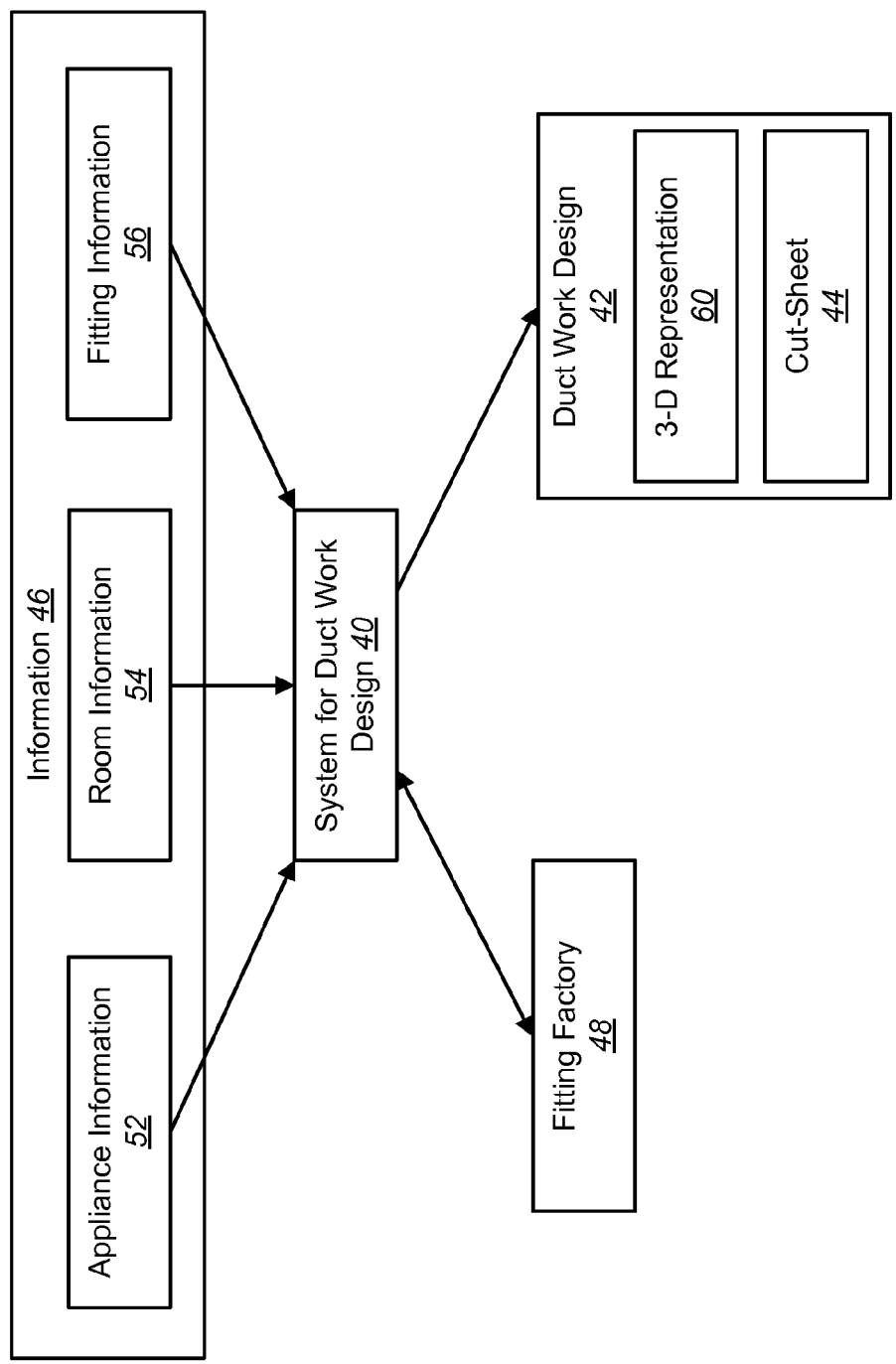
FIG. 2 is a block diagram of a system for duct work design according to one embodiment of the present invention.

Specifically, FIG. 2 is a block diagram that shows generally an embodiment of a system 40 for designing the duct work 20 (shown FIG. 1). This system 40 is designed to be implemented using a computer (not shown in FIG. 2). Specifically, the system 40 is designed such that information 46 may be input into the system 40. Once this information 46 has been input, the system 40 may then extract additional specifications and/or data from a fitting factory 48.

As will be discussed in greater detail below, the system 40 can then use the information 46 and the data from the fitting factory 48 to generate a duct work design 42. This duct work design 42 will generally comprise information (including sizes, angles, lengths and/or other specifications) that will teach and/or show a skilled artisan how to cut, bend, or otherwise manipulate sheets of metal into the duct work 20 so that this duct work 20 may then be installed in a building or house and connected to an HVAC unit 12. It should be noted that the system 40 may, in some embodiments, be a computer program or software that runs on a computer.

The information 46 that is input into the system 40 will depend, of course, on the particular piece of duct work 20 that is needed. In some embodiments, the information 46 will include appliance information 52, which is information that generally relates to the particular HVAC unit 12 to which the duct work 20 will be attached. Specific data that may be included within the appliance information 52 include:

the make and model number of the HVAC unit;
the size of the coil that is used in the HVAC unit;
the type of the HVAC unit (i.e., is it an air conditioner, a heat pump, a furnace, a "central air" system, a combination of a heating and cooling, etc.);
whether the HVAC unit uses electricity, natural gas, or some other type of fuel;
the location and size of the appliance return 21 on the HVAC unit;
the location and size of the appliance supply 23 on the HVAC unit, and/or any other information related to the appliance.

Depending on the particular embodiment, not all of the above-recited information may be necessary for the appliance information 52.

In some embodiments, the purpose of inputting the appliance information 52 into the system 40 is so that the system 40 will know the size and location of the appliance supply 23 and/or the appliance return 21 of the particular HVAC unit 12. Accordingly, such information regarding the size and/or location of the appliance supply 23/appliance return 21 may be input directly into the system 40. However (as will be described in greater detail below), other embodiments may be constructed in which the factory 48 stores information regarding the size/location of the appliance supply 23/appliance return 21. Accordingly, in these embodiments, all that the user may need to do is input the make and/or model number of the HVAC unit 12 (or other similar information) so that the system 40 can locate/extract the desired size/location information from the entries stored within a database.

Additional information related to the room 10 which houses the HVAC unit 12 may also be provided as part of the information 46. This information, which is referred to as room information 54, may including data regarding one or more of the following topics:

- the dimensions and size of the room;
- the location and size of the room return 22a;
- the location and size of the room supply 24a;
- where any existing piping and/or existing duct work is positioned in the room;
- any obstacles in the room that might interfere with the duct work 20;
- where the HVAC unit will be positioned within the room; and/or
- any other information related to the room that houses the HVAC unit.

Again, depending upon the particular embodiment, not all of the above-recited information may be needed as part of the room information 54. However, in most embodiments, the room information 54 will, at least, contain information related to the location/size of the room return 22a, the location/size of the room supply 24a, and information related to the position of the HVAC unit within the room.

Optionally, some embodiments may also include fitting information 56 as part of the information 46. Fitting information 56 allows the user to input into the system 40 any specific information that relates to the duct work 20 itself. This fitting information 56 may include

- information related to the size of the duct work;
- whether unusual sizes or dimensions must be used;
- whether the duct work is tapered, curved, bent, etc.;
- the material used to make the duct work;
- information related to other fittings already in the room;
- information related to other fittings to which the newly designed fitting will attach;
- the way in which the duct work must be attached to the existing vents and/or the appliance; and/or
- any other relevant information related to the fitting and/or the duct work in the house or building.

Again, depending on the embodiment, some (or all) of this fitting information may be omitted.

Of course, other embodiments may have further information—in addition to the appliance information 52, the room information 54, and the fitting information 56—input into the system 40 as part of the information 46. In fact, the present system 40 may be constructed and/or adapted such that any information that is relevant to producing the duct work design 42 may be input into system 40 and analyzed so that the optimal duct work design 42 for the HVAC unit 12 may be produced.

It should also be noted that the appliance information 52, the room information 54 and the fitting information 56 may be readily gathered and collected by a skilled technician. For example, room information 54 may be gathered by visiting the room in which the HVAC unit 12 will be placed and physically taking measurements of the room's dimensions/features using a tape measure (or other similar measuring device). This type of room measuring is well known and is currently done by installers of HVAC units 12. Similarly, fitting information 56 can likewise be obtained by inspecting the duct work and/or the room and, during this inspection, taking the appropriate measurements, notes, etc.

With respect to the appliance information 52, this information can also be easily gathered by, for example, examining product manuals, product information sheets, instruction manuals, books, Internet research, etc. Other aspects of the appliance information 52 may be obtained by inspecting the HVAC unit and/or the room, and during this inspection, taking the appropriate measurements, reviewing the information written on the HVAC unit, determining where the HVAC unit's inlet and outlet ports are located, determining the size of the coil, etc.

Once the relevant information 46 has been gathered, this information is input into the system 40. As the system 40 is generally implemented using a computer, the information 46 is input to the system using the computer's input devices. As will be described in greater detail below, once the system 48 has received the appropriate input information 46, the system 40 will use the input information 46 as well as information stored in the factory 48 to create duct work design 42.

This generated duct work design (or "fitting design") 42 will be of sufficient detail to teach a skilled artisan how to create a fitting or specific piece of duct work. Again, one of the main components of this duct work design 42 may be a cut sheet 44. Cut sheets 44 are design sheets (similar to blueprints or engineering/architectural design sheets) that give specifications of how a standard-sized metal sheet should be cut, folded, taped, to produce the desired piece of duct work 20. Thus, the cut sheet 44 will include an indication of (1) which standard-sized metal sheet should be used and (2) cut lines, fold lines, etc. that need to be made to this metal sheet. Using the information found on a cut sheet, a skilled artisan can take a standard cutting device and cut the metal sheet into the desired duct work.

However, in addition to producing a cut sheet 44, the duct work design 42 may be output in different formats, depending on the specifications of the user. For example, in some embodiments, the system 40 may produce a duct work design 42 that includes a three-dimensional (3-D) representation 60 of desired duct work and/or fitting. This 3-D representation 60 may be displayed using the monitor or television screen of the computer. Further embodiments may be constructed such that when the 3-D representation 60 is displayed, the representation 60 may be manipulated and/or rotated by the user. This 3-D representation 60 of the duct work 20 allows the user to visualize the "finished" duct work product and may assist the and/or the installer in understanding how the duct work should be cut, taped (using products known in the art), installed, etc.

Alternative embodiments may be constructed in which the duct work design 42 is output from the system 40 in other formats and/or other file types. For example, embodiments may be constructed in which the design 42 is output as an audio file that may be sent to a computer, a cell phone, a PDA, etc. Using this audio file, the user may hear the instructions regarding how to create the designed duct work 20. Additional embodiments may be constructed in which the duct work design 42 is output in a format (either a 2-D format or a 3-D format) that is readable by a portable computer (such as a PDA and the like). Further embodiments may be constructed in which the design 42 is output in a format (either in 2-D or 3-D format) that may be read by a computer's web browser. Yet further embodiments may have the design 42 output in a database format that may be used, stored, saved, etc. by a user.

Figure 3:
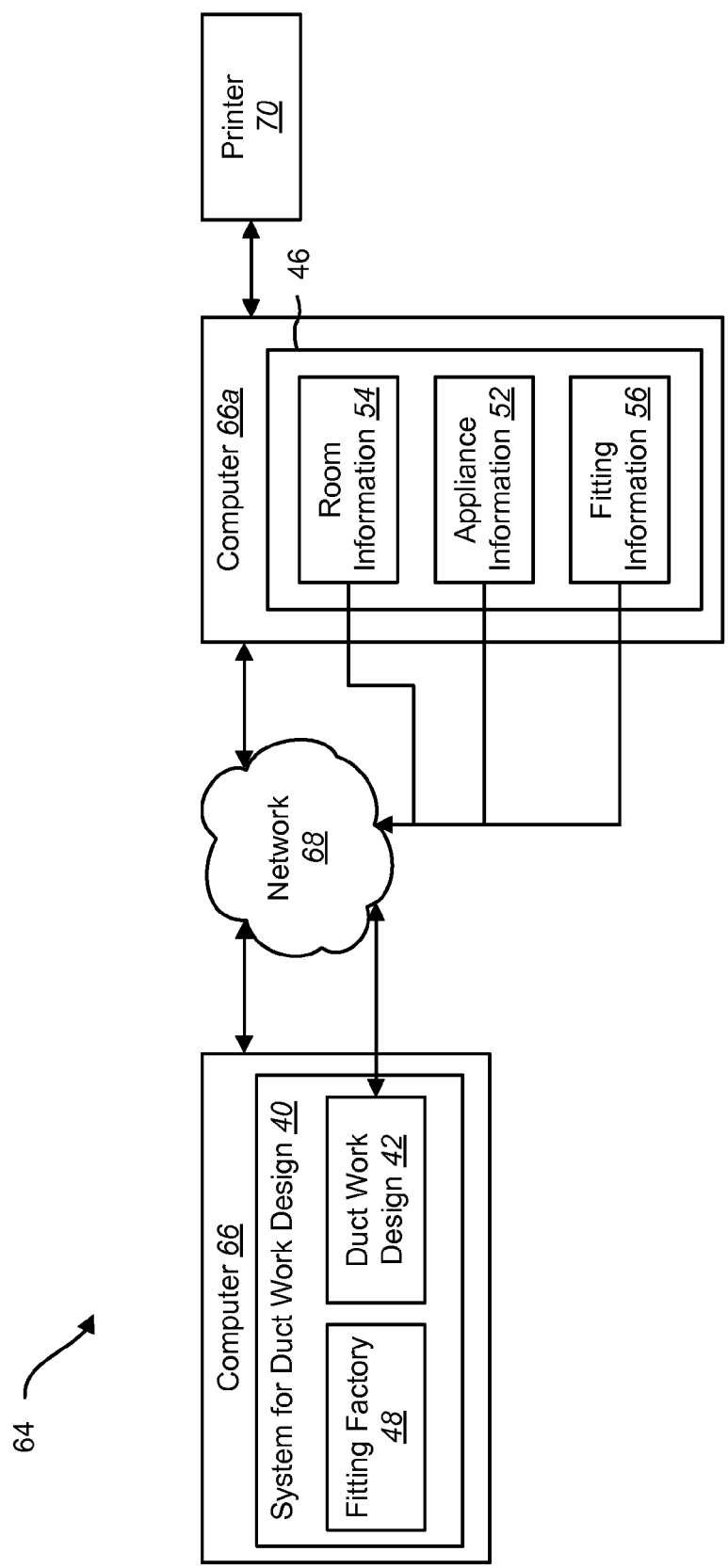
FIG. 3 is a block diagram of an embodiment which uses the system for duct work design according to the present invention.

Referring now to FIG. 3, an embodiment of a system 64 that implements the system 40 for duct work design using a computer 66 is depicted. As used herein, the term "computer" includes all types of electronic computing devices that are capable of processing information and include, but are not limited to, controllers, microcontrollers, hand-held computers, personal computers, desktop computers, mobile computer devices (including PDAs, cell phones, etc.), servers, mainframes, supercomputers, artificial intelligence systems, and/or combinations thereof.

As shown in FIG. 3, the system 40 is an application that runs on the computer 66. In some embodiments this system 40 will be a computer program, such as a program that is designed to run on either a Linux® operating system or on a Windows® operating system (or any other operating system). Moreover, as shown in FIG. 3, the fitting factory 48 is illustrated as being part of the system 40. Of course, further embodiments may be constructed in which the fitting factory 48 is not part of the system 40, but rather, is a separate application on the computer 66 that may communicate with the system 40. In yet further embodiments, the fitting factory 48 is located on a different computer (not shown) that may be accessed by the system 40 via wireless or wired communication technologies.

The computer 66 is designed to communicate with one or more client computers 66a via a network 68. This network 68 may be any type of computer network or other communications technology (including both wireless and/or wired technologies) through which two computers or devices may communicate. In some embodiments, the network 68 may comprise the Internet. However, other embodiments may be constructed in which the network 68 is a local area network, an intranet, an Ethernet network, etc.

In the embodiment shown in FIG. 3, the client computer 66a is a computer that may be used/accessed by a user. Thus, as shown in FIG. 3, the user may gather the information 46 (including the room information 54, the appliance information 52 and, if desired, the fitting information 56) and then input this information 46 into the computer 66a via the computer's input devices (such as the keyboard, mouse, touch-screen, etc.). In fact, any type of input device and/or input technology may be used to input the information 46 into the client computer 66a including manual data entry, importing data from another file, audio inputs, voice recognition systems, writing out the information and then "scanning" the document into electronic format, etc.

Once the information 46 is input into the client computer 66a, the information 46 may then be sent/transmitted to the system 40 (and/or the computer 66) via the network 68. In this manner—i.e., through the network 68—the information 46 is input into the computer 66 and the system 40. Of course, other embodiments may be constructed in which the information 46 is input directly into the computer 66 using the input devices (such as the touch-screen, keyboard, mouse, etc.) of the computer 66.

As noted above, once the information 46 has been input into the system 40, the system 40 may, using this information 46 and the information stored in the fitting factory 48, generate the duct work design 42. This duct work design 42 may then be output so that it may be viewed and used by a user. In some embodiments, the duct work design 42 comprises java files, Java 3D™ files, javascript files, html files, .pdf ("portable document file") files, and/or other types of computer files. In some of the present embodiments, a "turtle" graphics API device is used to create .pdf files for the output design 42. There are a variety of different types and/or ways in which the design 42 may be output.

In the embodiment shown in FIG. 3, the design 42 is output by having the computer 66 send the duct work design 42 to the computer 66a via the network 68. In other embodiments, the design 42 will be output directly from the computer 66 such as to a computer monitor, a printer, a cutting device, and/or any other device that is in electronic communication with the computer 66.

If the duct work design 42 is sent from the computer 66 to the client computer 66a, this design 42 may be configured such that a user may manipulate and/or access the design 42. In some embodiments, this may occur by having the 3-D representation 60 (not shown in FIG. 3) and/or the cut sheets 44 (not shown in FIG. 3) display upon the monitor or other output devices of the computer 66a. Once the 3-D representation 60 is displayed on the computer monitor (or other output device), this 3-D representation 60 may then be rotated, modified, manipulated, etc. as desired. Further embodiments may be constructed such that the cut sheets 44 are java files, javascript files, html files, or .pdf files that may be printed out on paper via a printer 70.

Figure 4:
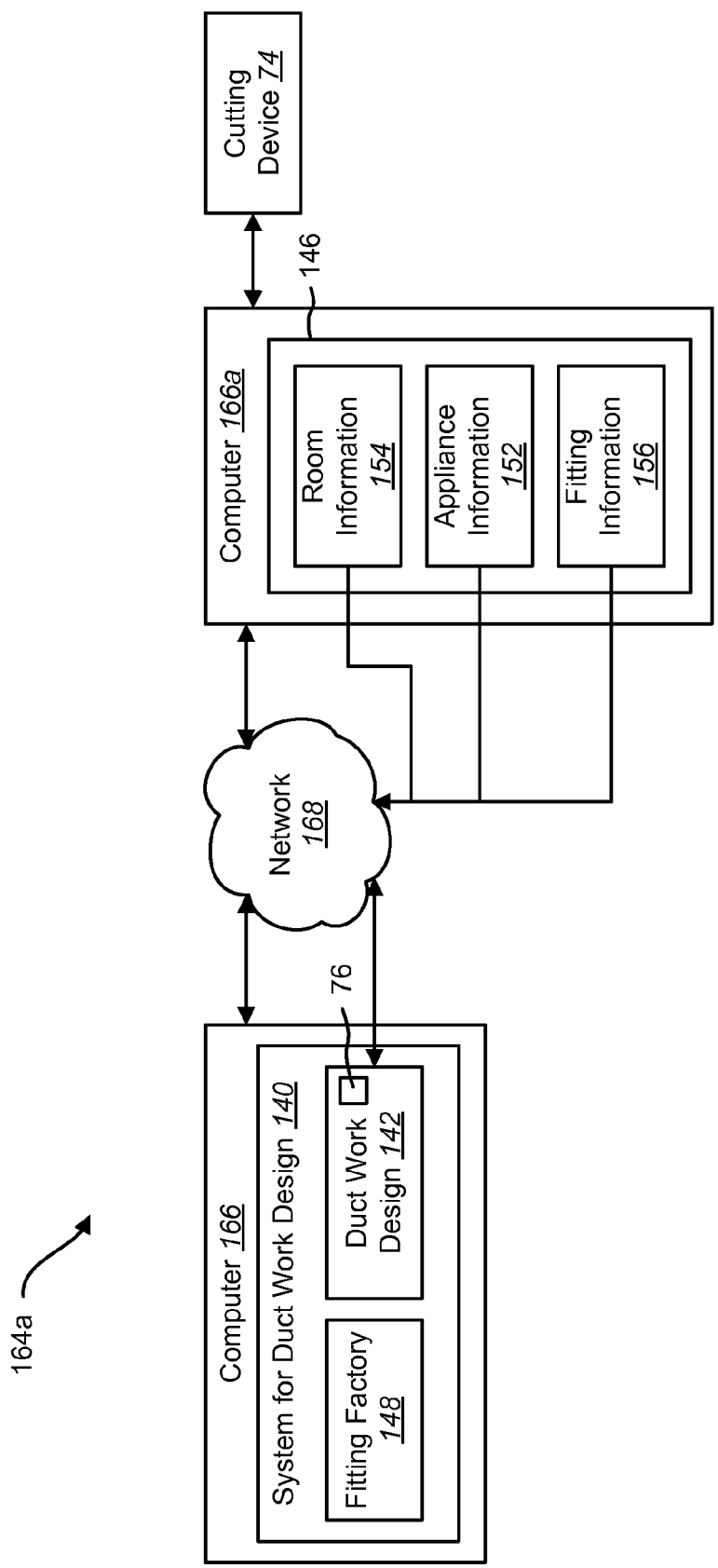
FIG. 4 is a block diagram of a further embodiment which uses the system for duct work design according to the present invention.

Referring now to FIG. 4, another embodiment 164a that implements the system 140 for duct work design is illustrated. The embodiment 164a that is shown in FIG. 4 is similar to the system 64 of FIG. 3. One difference between the system 164a of FIG. 4 and the system 64 of FIG. 3 is that in FIG. 4, the client computer 166a is in electronic communication (via wireless or wired technologies) with a cutting device 74 rather than a printer 70. Of course, other embodiments may also be constructed in which the cutting device 74 is connected directly to the computer 166 rather than the client computer 166a.

The cutting device 74 is a plasma cutter or other type of machine that may be used to cut metal and prepare duct work. Thus, in the embodiments shown in FIG. 4, when the duct work design 142 (which includes the cut sheet 44) is output from the system 140, the design 142 is sent (either directly or through the computer 166a) to the cutting device 74 so that the cutting device 74 may create the duct work 20. Thus, using the programming commands 76 as well as the information in the cut sheet 44, the cutting device 74 may automatically cut the metal sheet into the desired duct work design without the need for a human to operate the cutting device 74. In some embodiments, such automated operation of the cutting device 74 may be beneficial in that it will reduce the possibility of human/operator error and/or allow the cutting device to operate during times when the operator is not present (such as at night, during holidays, during lunch breaks, etc.)

However, in order for the cutting device 74 to create the duct work 20, the output duct work design 142 must be in a format that may be read and implemented by the cutting device 74. Thus, in some embodiments, the duct work design 142 may include programming commands 76 which are designed to control the cutting device 74 and cause the cutting device to cut the metal sheet. In other embodiments, the design 142 may be output as an "export" file that may be read by the cutting device 74. Still other embodiments may be designed such that the design 142 is output in a database format that may be accessed/read by the cutting device 74. Other ways for inputting the information stored in the design 142 into the cutting device 74 may also be used.

Figure 5:
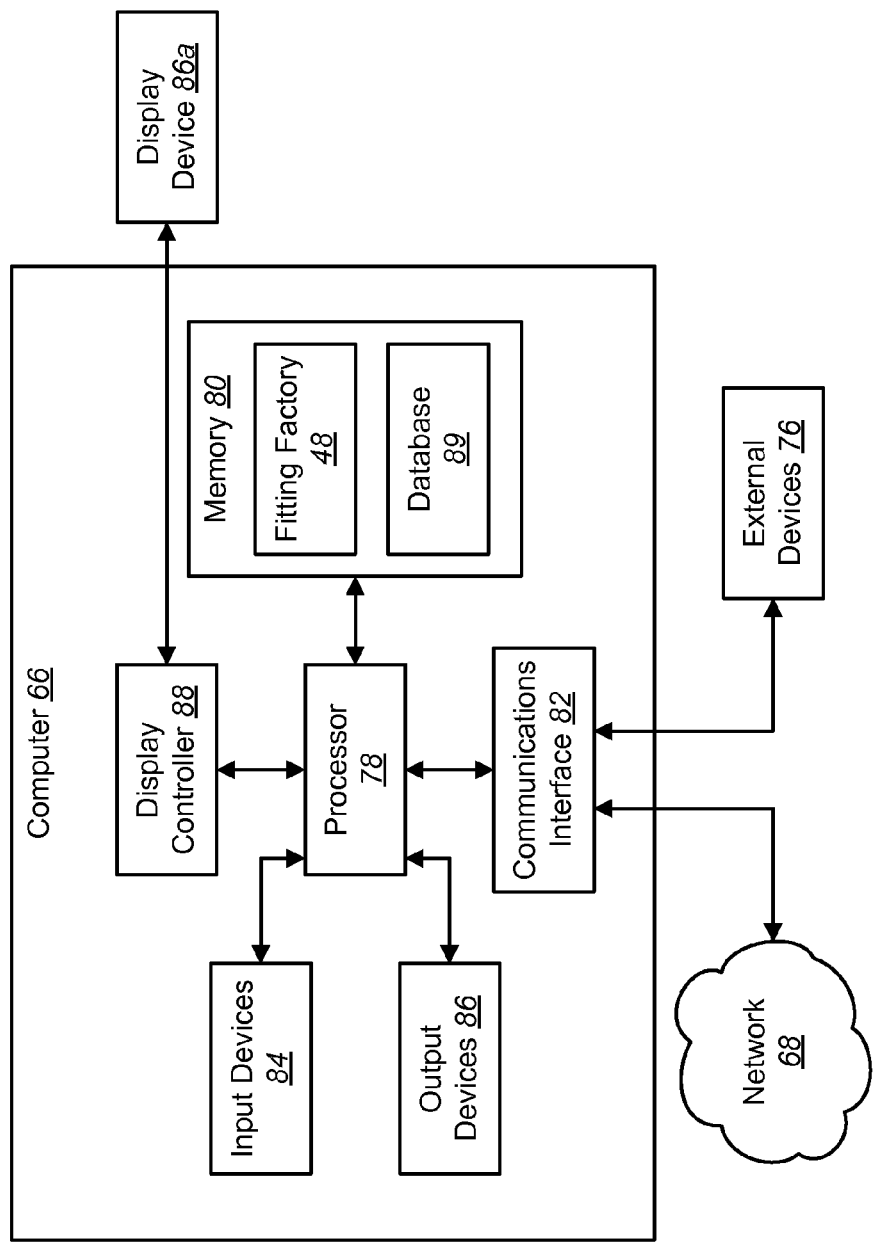
FIG. 5 is a block diagram of a computer that may be used in conjunction with an embodiment of the present invention.

Referring now to FIG. 5, a block diagram is shown illustrating the major hardware components of an embodiment of the computer 66 that may be used in conjunction with the embodiments of the present duct work design system. As the client computer 66a may be identical to the computer 66, this depiction of the computer 66 applies equally to the components that may be used as part of the client computer 66a as well.

As shown in FIG. 5, many different types of computers and computer components may be used to implement the computers 66, 66a illustrated herein. The components shown in FIG. 5 may be located within the same physical structure or in separate housing or structures. The computer 66 may include a processor 78 and a memory 80. As shown in FIG. 5, the fitting factory 48 is stored within the memory 80. However, as noted above, other embodiments may be constructed in which the fitting factory 48 is part of a different computer and/or is a separate component of the computer 66.

The processor 78 controls the operation of the computer 66 and may be embodied as a microprocessor, a microcontroller, a digital signal processor (DSP) or other device known in the art. The processor 78 typically performs logical and arithmetic operations based on program instructions stored within the memory 80.

As used herein, the term memory 80 is broadly defined as any electronic component capable of storing electronic information, and may be embodied as read only memory (ROM), random access memory (RAM), magnetic disk storage media, optical storage media, flash memory devices in RAM, on-board memory included with the processor 78, EPROM memory, EEPROM memory, registers, etc. The memory 80 typically stores program instructions and other types of data. The program instructions may be executed by the processor 78 to implement some or all of the methods disclosed herein.

The computer system 66 typically also includes one or more communication interfaces 82 for communicating with other electronic devices. The communication interfaces 82 may be based on wired communication technology, wireless communication technology, or both. Examples of different types of communication interfaces 82 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The communications interface 82 is designed such that it allows the computer 66 to communicate with the network 68 (and, in turn, other computers 66a which are likewise in communication with the network). Additionally, the communications interface 82 may be in communication with one or more external devices 76. These external devices may be any electronic device, as desired. Specific embodiments may be constructed in which the external device 76 comprises the printer 72 and/or the cutting device 74.

The computer system 66 typically also includes one or more input devices 84 and one or more output devices 86. Examples of different kinds of input devices 84 include a keyboard, mouse, microphone, remote control device, button, joystick, trackball, touchpad, lightpen, etc. Examples of different kinds of output devices 86 include a speaker, printer, etc. One specific type of output device which is typically used with a computer system is a display device 86a (which is sometimes called a "monitor"). Display devices 86a used with embodiments disclosed herein may utilize any suitable image projection technology, such as a cathode ray tube (CRT), liquid crystal display (LCD), light-emitting diode (LED), gas plasma, electroluminescence, or the like.

A display controller 88 may also be provided, for converting data stored in the memory 80 into text, graphics, and/or moving images (as appropriate) shown on the display device 86a. Of course, FIG. 5 illustrates only one possible configuration of a computer system 66. Various other architectures and components may be utilized. Further embodiments may be constructed in which one or more of the above-recited components are omitted from the computer 66.

As shown in FIG. 5, embodiments may be further constructed in which the computer 66 additionally comprises a database 89 that stores information regarding various HVAC units 12, fittings, etc., that may be useful to the system 40 in calculating/designing the duct work 42. The database 48 is not required for all embodiments. However, for convenience, it may be desirable to include the database 48. In FIG. 5, the database 89 is stored within the memory 80. Of course, as noted above, other embodiments may be constructed in which the database 48 is part of a different computer and/or is a separate component of the computer 66. For example, the database 89 may be accessed on the Internet. Other embodiments may be constructed in which the database 89 is a portion of the factory 48.

Figure 6:
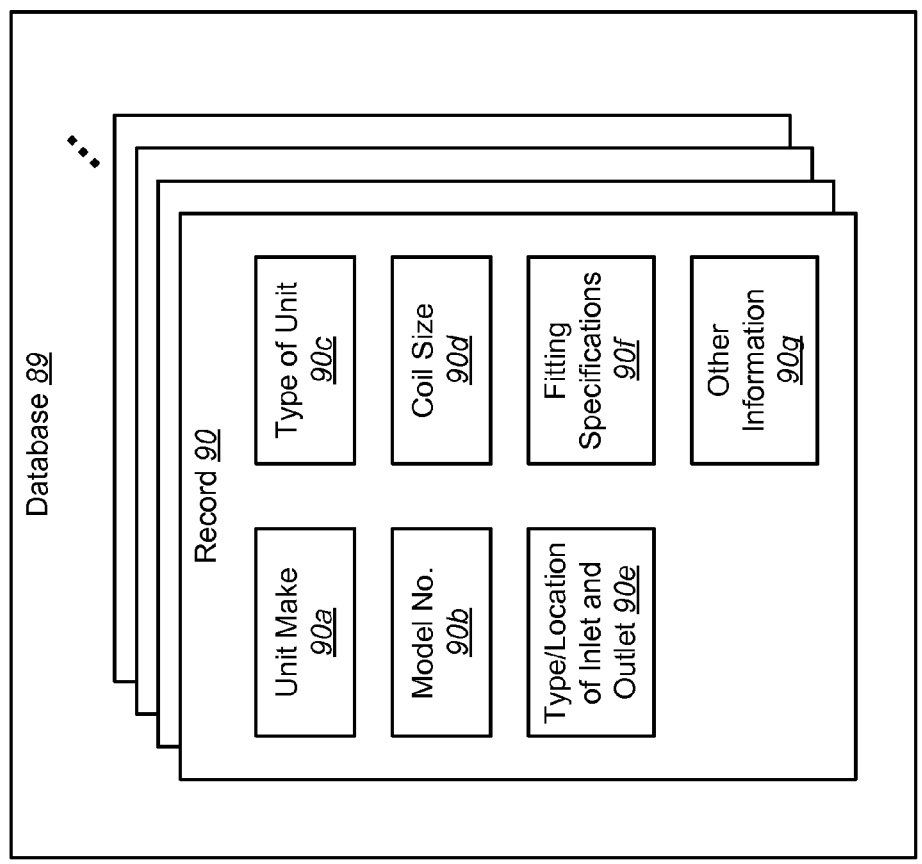
FIG. 6 is a block diagram of a database that may be used in embodiments of the present invention.

Referring now to FIG. 6, a block diagram of an embodiment of the database 89 is illustrated. The database 89 is designed to store information regarding specific types of HVAC units 12 (not shown in FIG. 6) and the features associated with various HVAC units 12 and/or the duct work 20 (not shown in FIG. 6) that may be used in conjunction with the HVAC units.

As shown in FIG. 6, the database 89 comprises multiple records 90 which contain information regarding each specific type of HVAC unit. There can be anywhere from 1 to N records in the database 89, wherein N represents any positive integer. Obviously, as the number of records 90 in the database 89 increases, there will be a greater amount of information housed in the database 89 and the system 40 that uses the database 89 will be able to construct duct work designs 42 for a greater number of potential HVAC units and applications.

In FIG. 6, each record 90 will contain specific "fields" or categories 90a-90g that contain different types of information related to each type of HVAC unit 12. Of course, the exact fields that are listed in FIG. 6 are just one example of the fields that may be used as part of the database 89. Other embodiments may be constructed in which additional fields are found in the database 89 which are above and beyond that which is shown in FIG. 6. Likewise, further embodiments may be constructed in which the database 89 omits one or more of the fields 90a-90g that are shown in FIG. 6.

For example, as shown in FIG. 6, one of the fields found in the database 89 is a "Unit Make" field 90a. This field 90a is designed to contain information regarding the manufacturer of the particular HVAC unit 12. Typical manufacturers of HVAC units include "CARRIER®", "BRYANT®", "TRANE®", and many others.

Other fields that may be used as part of the database 89 include the "Model No." field 90b and the "Type of Unit" field 90c. The Model No. field 90b is designed to store the serial number/model number for the particular type of HVAC unit. As "CARRIER®", "BRYANT®", "TRANE®", and other HVAC unit manufacturers have multiple different-sized HVAC units, each of these different-sized units should be distinguished by their model number or their serial number. Likewise, the "Type of Unit" field 90c stores information regarding what type of unit is each particular device—i.e., is the unit a heat pump, a furnace, a central air system, an air conditioner, etc.

An additional field, 90d, allows the database 89 to store information regarding the coil size (or coil sizes) that are compatible with each particular HVAC unit. As is known in the art, consumers often need/want to replace or upgrade the coil for their particular unit. (The coil is an optional, external piece that may improve the overall efficiency/functioning of the HVAC unit). Accordingly, "Coil Size" field 90*d* stores information regarding the size and/or type of coil that may be used with each particular HVAC unit.

The "Type/Location of the Inlet and Outlet" field 90*e* stores information regarding the position and/or size of the appliance return 21 and the appliance supply 23 that are on the HVAC unit. As is known in the art, some HVAC units have their return and/or supply positioned on the top of the unit (such as the unit 12 shown in FIG. 1) whereas other units may have the inlet port and/or the outlet port positioned on the side of the unit. Accordingly, such information may be stored in the "Type/Location of the Inlet and Outlet" field 90*e*. The size of the appliance return 21 and/or the appliance supply 23 may also be stored. Other information regarding the unit's air inlet and air outlet ports may also be stored within the field 90*e*, as desired.

Additional information regarding the particular types of fittings or duct work required for the HVAC unit may be stored in the "Fitting Specifications" field 90*f*. Again, some HVAC units 12 may have special sizes and/or requirements (including tapering requirements) for their fittings and/or duct work. Accordingly, the field 90*f* allows such information to be stored within the database 89.

One or more fields that will store other information 90*g* may also be used in conjunction with the database 89. This other information field 90*g* may allow a particular user to tailor the database according to the user's specifications. For example, customer names, customer address, billing information, etc. may all be placed into the other information field 90*g*.

It is also worth mentioning that in some embodiments, the database 89 may be designed such that the information contained within the database 89 is readily searchable by a user. Specifically, the user may search the information using queries or search terms. The database will then find the records 90 in the database 89 that most closely match the user's query. For example, a user may query the database 89 generally for all HVAC units made by "BRYANT®" or by searching for customer name, etc. Other embodiments may be designed such that the user has the ability to limit the search to one or more of the fields 90*a*-90*g*. These types of queries will search only the specified field(s). An example of such a search includes a query for the term "TRANE®" in the "Unit Make" field 90*a* or a search for the term "heat pump" in the "Type of Unit" field. Combinations of these types of searches may also be used (such as for example, a query for the term "TRANE®" in the "Unit Make" field and the term "heat pump" in the "Type of Unit" field 90*c*, etc.). Generally, such searching capabilities of the database 89 will use a Boolean search and/or Boolean algorithms. However, other types of search engines or search protocols/algorithms may be used.

Furthermore, as noted above, the database 90 may be designed such that it will find the appropriate record 90 in the database 89 based upon entered information. For example, if a user enters information related to the unit make and/or unit model number of the HVAC 12, the database 89 searches to find the appropriate record 90. Once the database 89 has located the record 90, the system 40 may then extract from that particular record 90 other important information, such as the size/location of the appliance supply 21 or appliance return 23. Thus, in those embodiments that contain the database 89, the user need only enter in enough information to locate the particular record 90, and then the system 40 will automatically extract other additional, relevant information.

Figure 7:
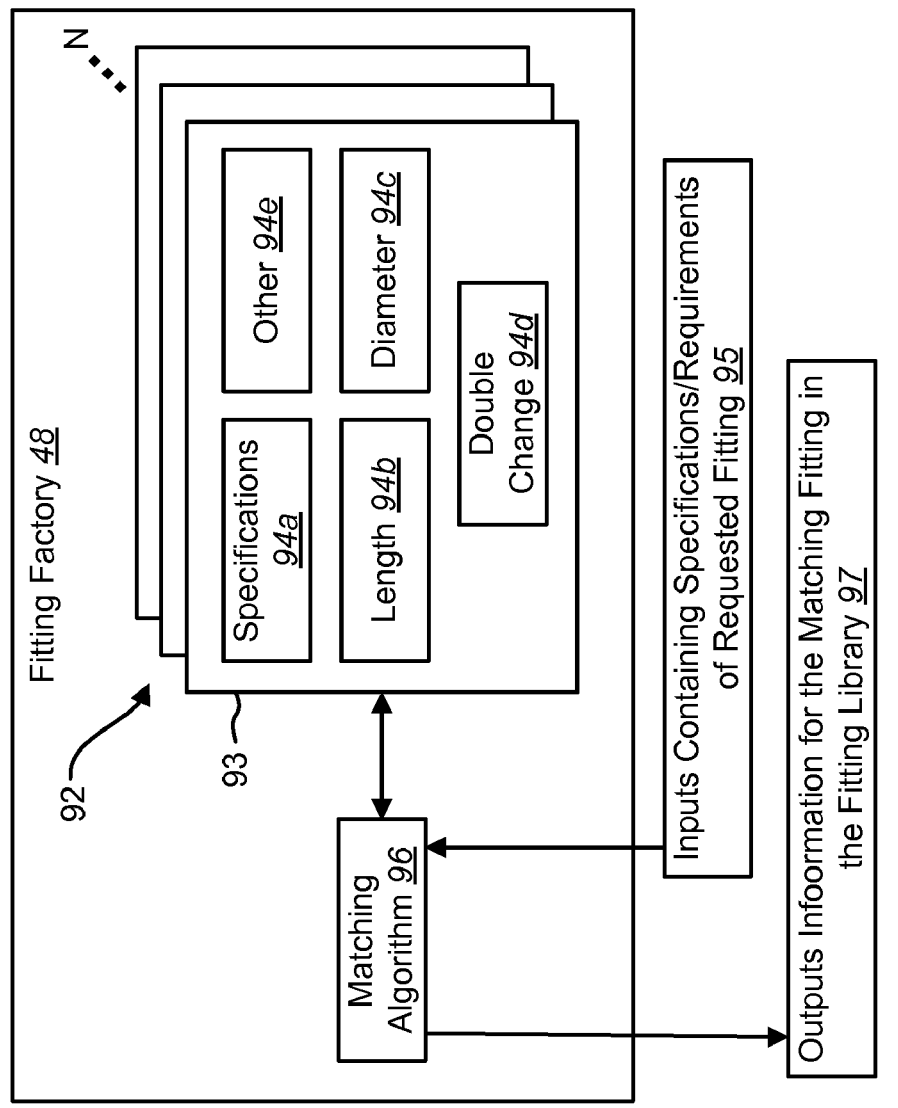
FIG. 7 is a block diagram of a fitting factory that may be used in embodiments of the present invention.

Referring now to FIG. 7, a block diagram of one embodiment of a fitting factory 48 is illustrated. As noted above, the fitting factory 48 may be implemented as part of the system 40 or the factory 48 may be a separate system that is implemented on the computer 66/client computer 66*a* or other computing device.

The fitting factory 48 will generally include a fittings database 92 that contains fitting records 93. As shown in FIG. 7, the number of records 93 found in the fittings database 92 may be anywhere from 1 to N records, wherein N represents any positive integer. Each individual record 93 will include information about one particular fitting. Examples of the fittings that will be in the fittings database 92 include standard fittings such as a "radius 90" fitting, a "straight" fitting, a "double change" fitting, etc. Other types of fittings may be used to populate the fitting database 93 as well.

Like other types of databases, the fittings database 92 will generally store information regarding the fittings in searchable fields so that the stored information may be easily accessed, searched, manipulated, etc. Of course, the exact number or name of the fields used in the fitting database may vary according to each embodiment. One example of a field that may be used is a specification field 94*a* which will house information regarding the specifications (including size, composition, shape, etc.) of the particular fitting. Likewise, a "length" field 94*b* will house information regarding the length of the fitting whereas a "diameter" field 94*c* houses information regarding the size of the diameter of the fitting. A "double change" field 94*d* houses information regarding whether the fitting is a "double change" fitting (i.e., whether the diameter of the fitting is constant along the entire length of the fitting). Finally, one or more other fields 94*e* may house additional information regarding the particular fitting, as desired.

Additionally, the fitting factory 48 includes a matching algorithm 96 that searches the fittings database 92 and determines which entry in the database 92 most closely matches the input requirements/specifications. More specifically, the matching algorithm 96 is designed to receive, from the system 40, inputs 95 containing specifications/requirements (i.e., the size, length, diameter, etc.) of a requested fitting. (As will be described below, these input requirements/specifications 95 are generally received from the system 40.) Using these input requirements, the matching algorithm 96 will search (such as using the fields 94*a*-94*e*) the database 92 to find the record 93 (or records 93) of the fitting that matches the input specifications/requirements. Once the matching algorithm 96 determines which of the fittings in the database 92 most closely matches the input specifications/requirements 95, the matching algorithm 96 will output information 97 regarding this matching fitting (i.e., the size, diameter, opening locations, etc.) to the system 40.

It should be noted that if the input specifications/requirements 95 do not identically match the specifications of any of the fittings that are listed in the fittings database 92, then the matching algorithm 96 may rate/determine which of the records 93 is most analogous to the input requirements/specification 95. In some embodiments, this type of determination is accomplished via known search engine methods/algorithms that assign "percentages" of similarity based upon how similar the document is to the search terms, how often the search term appears in the document, etc. Other embodiments may use other methods for determining which record 93 is most similar to the input requirements/specifications 95 such as artificial intelligence systems and the like.

The fitting factory is an implementation of the standard factory pattern. In this pattern, the factory object receives a request for a fitting with some information or hints that will allow the factory object to select the appropriate fitting object.

Once the factory object has received the hints from the request, it uses logic to select a fitting object. The factory then instantiates/creates the fitting object and fills it with the needed information and returns the new fitting object to the requester.

An example of the operation of the matching algorithm 96 illustrates how the factory 48 may be used in conjunction with the system 40. For example, if the system 40 sends to the factory 48 input specifications/requirements 95 indicating that a "straight" fitting having a length of about five feet is needed, the matching algorithm 96 will receive these specifications/requirements 95 and then commence a search of the fittings database 92. Such searching of the fittings database 92 will continue until the matching algorithm 96 finds a record 93 that is identical to the input specifications/requirements 95. If no record 93 was identical to the specifications/requirements 95, then the algorithm 96 will determine which of the records 93 is most analogous or similar to the input specifications/requirements 95. Then, after the algorithm 96 has found/determined the appropriate record 93, the algorithm 96 will extract information from this record 93—i.e., information regarding the fitting—and output 97 this information back to the system 40 so that the system 40 may use this fitting in the duct work design 42.

Figure 8:
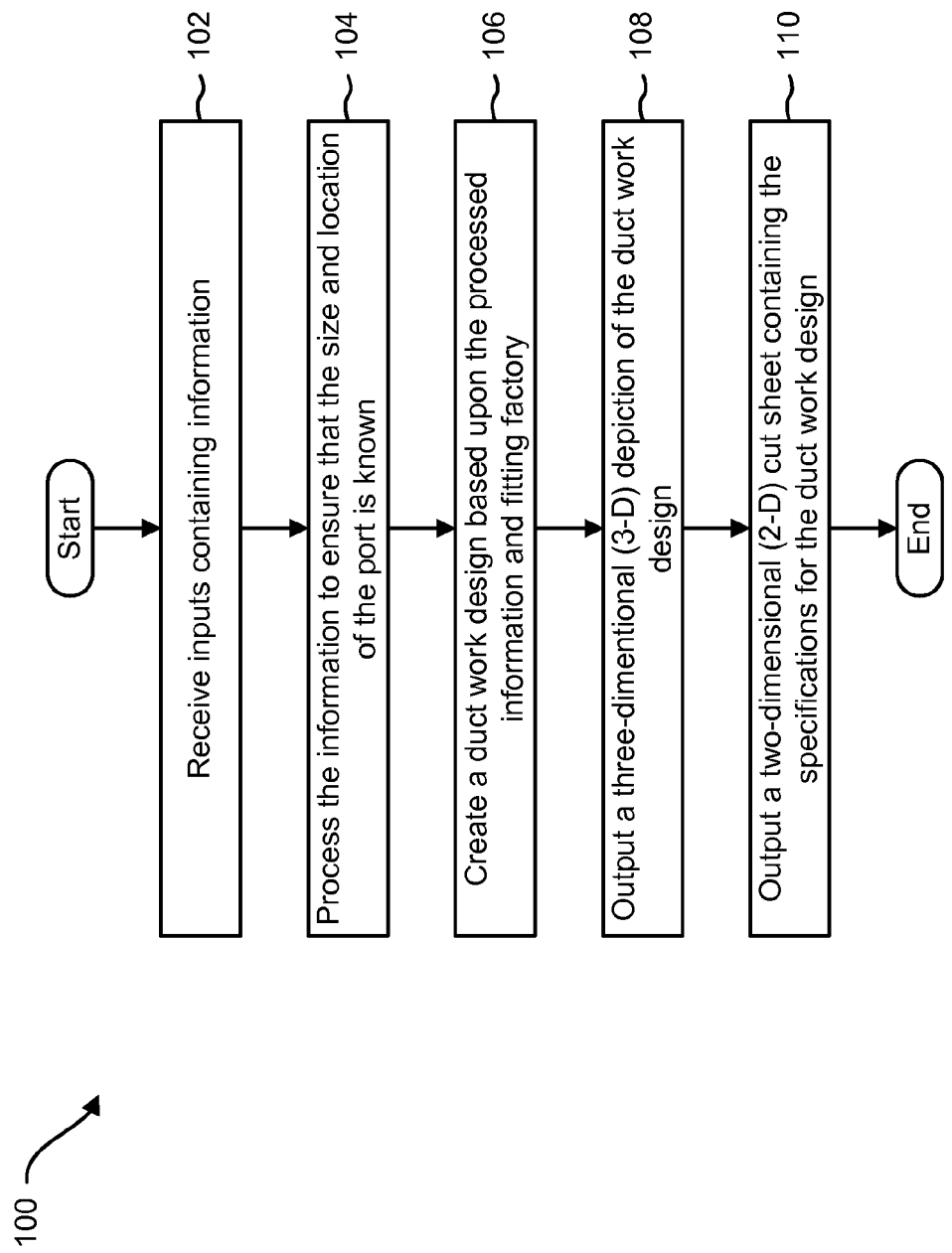
FIG. 8 is a flow diagram outlining the steps of a method of duct work design according to one embodiment of the present invention.

Referring now to FIG. 8, a flow diagram of a method 100 for designing duct work 20 (not shown in FIG. 8) is illustrated. This method may be implemented by a system 40 on a computer 66. The method begins when the system 40 receives 102 inputs containing information 46. Such information 46 may be directly input into the system 40 and/or the computer 66 using the computer's input devices 84. Alternatively, as discussed in conjunction with FIGS. 3 and 4, the information 48 may be input into a client computer 66a and then transmitted to the computer 66 and the system 40 via the network 68.

The information 46 that is input into the system 40 may include the room information 52 and the appliance information 52. Specifically, the information 46 will generally include (1) the size and location of the room supply 24a, (2) the size and location of the room return 22a, and (3) the size and location of the appliance supply 23 and appliance return 21 (including both the location of these ports within the room and the location of these ports on the HVAC unit itself). Of course, other types of information, including other types of room information 52, other types of appliance information 52, and/or fitting information 56 may also be added.

Once the information 46 has been input into the system 40, the system 40 may then process 104 the input information 46. Generally, the input information will be processed to ensure that the size and location of the "port" is known. As used herein, the term "port" refers to openings that need to be connected to duct work 20 in order for the HVAC 12 to heat/cool the building. Specifically, the term "port" refers to the appliance supply 23, the appliance return 21, the room return 21a and the room supply 24a. Thus, the processing step 104 means that the system 40 ensures that it knows the size and location of the room supply 24a, the size and location of the room return 21a, the size and location of the appliance return 21, and the size and the location of the appliance supply 23.

In some embodiments, the processing step 104 may involve calculating and/or obtaining from the database 89 additional information required by the system 40. For example, the user may input information regarding the make and model number of the HVAC unit 12, and then the processing step 104 may involve searching the database 89 to find requisite information regarding the HVAC unit 12 (such as information about the size of the appliance return 21/appliance supply 23, information about the location of the appliance return 21/appliance supply 23, whether the appliance supply 23/appliance return 21 is located on the top, bottom, or side of the unit 12, etc.).

In other embodiments, the processing step 104 may involve calculating the location of the appliance supply 23/appliance return 21 and/or the room return 21a/room supply 24a. As noted above, embodiments may be constructed in which the user has input to the system 40 the dimensions of the room (such as 20×20 foot room) as well as the position of the room supply 24a with respect to two of the walls of the room (i.e., the front wall and the right side wall, or the back wall and the left side wall, etc.) Using this "relative" position information (i.e., relative to the position of the walls), the system 40 may then calculate the precise position of the room supply 24a. A similar process will also be used to determine the "relative" position of the room return 21a.

Further, a similar process may also be used to determine the "relative" position of the appliance supply 23/appliance return 21. If the user has input the "relative" position of the HVAC unit 12 with respect to two of the walls of the room and the user has also entered information about the make/model number of the HVAC unit (or other identifying information), then the processing step 104 will allow the system 40 to calculate the position of the appliance supply 23/appliance return 21. Specifically, the processing step 104 will calculate the "relative" position of the HVAC unit 12 within the room and then, using information related to the location of the appliance supply 23/appliance return 21 on the appliance that is contained in the database 89, calculate the exact position within the room of the appliance supply 23 and the appliance return 21. In this manner, the user may only have to enter a limited amount of simple data (i.e., the room dimensions, the location of the appliance within the room, and the make and model of the HVAC unit) and the system 40 will have the information that it needs.

Once this information 46 has been processed, the system 40 may then create 106 a duct work design 42 using this processed information and the fitting factory 48. Specifically, the creating step 106 involves having the system 40 calculate, using the processed information, the specifications for one or more of the fittings that are needed to connect the appliance supply 23 to the room supply 24a and the appliance return 21 to the room return 22a. Once one or more of the appropriate fittings 20 have been calculated, the system 40 will use the fitting factory 48 to, in the manner described above in conjunction with FIG. 7, determine which of the fittings in the fittings database 92 most closely matches the calculated fitting. These fittings (or fitting) that are obtained from the fittings factory 48 will then be used to create the duct work design 42.

A variety of different methods/processes/algorithms may be used by the system 40 in creating 106 the duct work design 42 using the fitting factory 48 and the processed information. Two embodiments of algorithms that may be used will be described in greater detail below. These two embodiments are not limiting. Other embodiments may use other methods/algorithms that will similarly calculate/create the duct work design 42.

As noted above, the duct work design 42 will generally include one or more cut sheets 44. As noted above, these cut sheets 44 are two-dimensional ("2-D") sheets that contain the dimensions, measurements, and other information necessary to cut, fold and/or manipulate a metal sheet into the specified duct work 20. Accordingly, once the duct work design 42 has been created, the 2-D cut sheet 44 containing the specifications for the duct work design 42 will be output 110 by the system 40. In some embodiments, this outputting 42 may be accomplished by using the output devices 84 of the computer 66.

Other embodiments may be constructed in which the cut sheet 44 is output and communicated to the client computer 66 via the network 68. In these embodiments, the cut sheet 44 may be a .pdf file, an html file, a java or java script file or other type of computer file. Accordingly, once the cut sheet 44 reaches the client computer 66a, the user may then manipulate the cut sheet 44 as desired. In some embodiments, the user may send the cut sheet 44 to a printer 72, a cutting device 74, or another external device, as described above.

Referring still to FIG. 8, in those embodiments in which the duct work design 42 comprises a 3-D representation 60 of the duct work 20, the method 100 may comprise the additional step of outputting 108 a 3-D representation 60 of the duct work design 42. In some embodiments, such outputting 108 may be accomplished using the output devices 84 of the computer 66. Further embodiments may be constructed in which the outputting 108 is accomplished by sending the 3-D representation 60 to the client computer 66a. Once the 3-D representation 60 reaches the client computer 66a, this representation 60 may be displayed/viewed on the monitor 86a. Using this monitor 86a, the user may manipulate, rotate, and/or otherwise change the representation 60 as desired. If the user desires to change or rotate the representation 60, such changes can easily be made using the computer's input devices 84.

It should be noted a variety of methods may be used in creating the 3-D representation 60. In some of the present embodiments, this representation 60 may be generated as follows. Once the system 40 creates the command to generate the 3-D representation 60, the system 40 may draw a representation of the room (including the dimensions of the room, the HVAC unit, the room supply, the appliance supply, the room return and the appliance return). Then, the system 40 may draw each specific fitting (according to the specifications/sizes found in the fitting) and may place these fittings in sequential order within the room, in the appropriate location. However, other embodiments and/or ways of creating the 3-D representation 60 may also be used.

Figure 9:
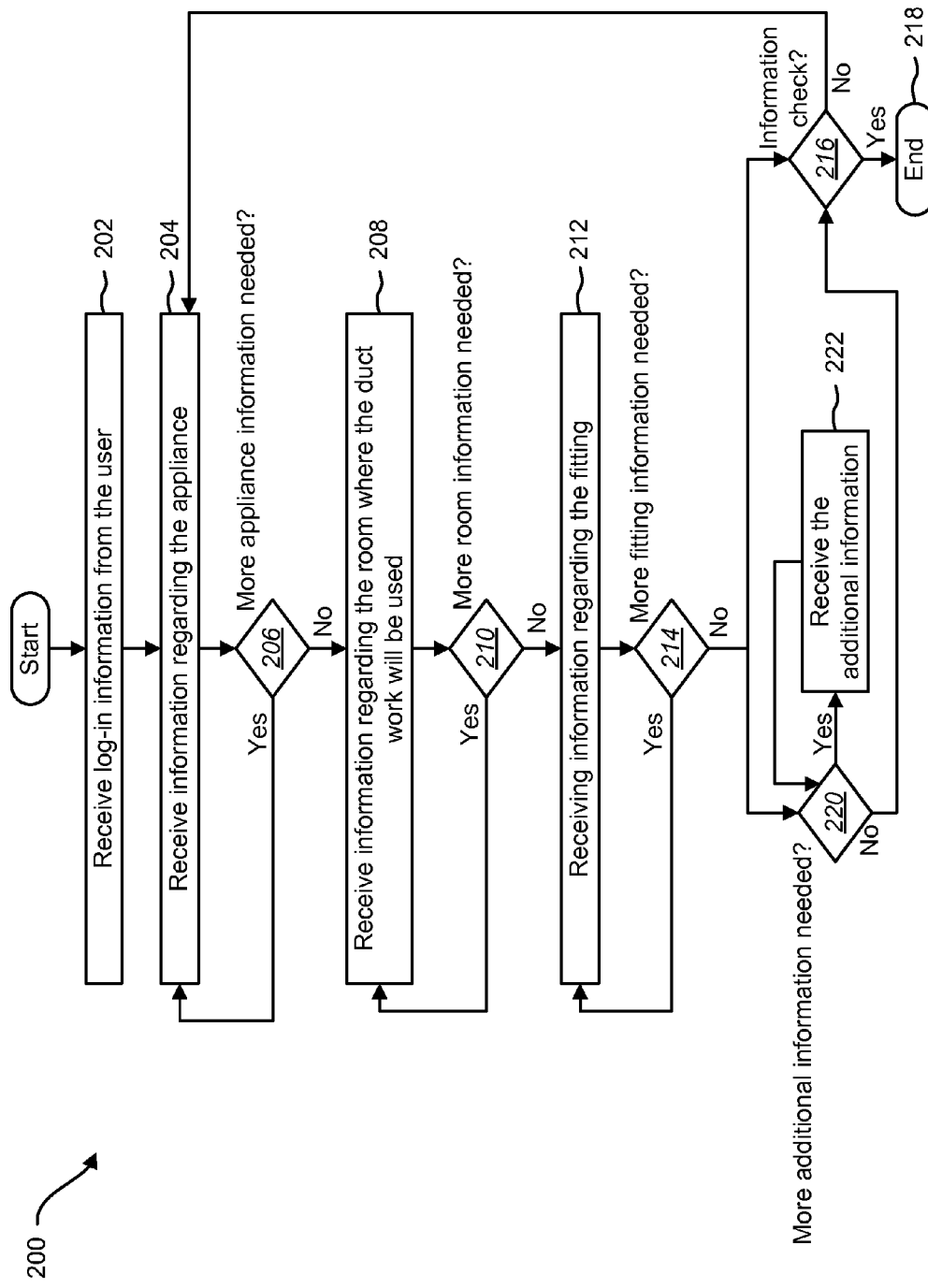
FIG. 9 is a flow diagram of an embodiment of a method for receiving input information that may be used in conjunction with the method shown in FIG. 8.

FIG. 9 is a flow diagram that illustrates one embodiment of a method 200 by which the system 40 may receive the input information 48. This method 200 may be used, in whole or in part, as the receiving inputs step 102 of FIG. 8.

In order for the duct work 20 to fit the HVAC unit 12, it is important that the information 48 provided to the system 40 is accurate and as thorough as possible. Accordingly, FIG. 9 shows a method 200 that the system 40 will use that is "user-friendly" and will ensure that the information 48 that is input into the system 40 is as accurate and thorough as possible.

The method 200 begins by having the system 40 receive 202 the "log-in" information from the user. Again this log-in information, like all the information that is input in the method 200, may be input directly into the computer 66 or may be input into the client computer 66a and then transmitted to the computer 66 via the network 68. The log-in information for the user will generally comprise, as is known in the art, a user name and password. This log-in information is designed so that the system 40 will know the identity of the person(s) accessing the system. In some embodiments, it may be important for the system 40 to know who is accessing the system 40 for security reasons and/or for billing purposes (if the system 40 is available for a fee).

Once the system 40 has verified the user's log-in information, the method proceeds by having the system 40 receive 204 information regarding the appliance—i.e., appliance information 52. In some embodiments, the system 40 may facilitate the reception of the appliance information 52 through the use of questions and/or "fill-in-the-blanks" which ask the user to supply the appliance information 52. For example, the system 40 may query the user to have him/her type in the manufacturer of the HVAC unit and/or the model number of the HVAC unit. Alternatively, the system 40 may be designed to supply a list having various manufacturers/model numbers of HVAC units and then ask the user to select the appropriate HVAC unit from the list. Additional appliance information 52 may include the location/size of the appliance return 21 and the appliance supply 23 on the unit. Of course, other embodiments may also be constructed in which other techniques and/or methods for extracting the appliance information 52 from the user.

After the system 40 has received 204 the appliance information 52, the method 200 proceeds to the decision block 206. In the decision block 206, the system 40 determines whether or not additional appliance information 52 is needed from the user. If the system 40 determines that additional appliance information 52 is needed, the method 200 will return to step 204 to receive the further appliance information 52. This process will be repeated until the decision block 206 determines that sufficient appliance information 52 has been received from the user.

Once sufficient appliance information 52 has been entered, the method 200 will proceed to receive 208 information regarding the room—i.e., the room information 54. As with the appliance information 52 discussed above, embodiments may be constructed in which the system 40 facilitates the reception 208 of the room information 54 by asking the user questions and/or requesting that the user supply the room information 54 via "fill-in-the-blank" questions. For example, embodiments may be constructed in which the system 40 asks the user to enter in the dimensions of the room into blanks provided by the system 40. Other embodiments may have the user enter the location of the HVAC unit within the room by asking the user to enter how far the HVAC unit is located from the front wall, the left wall, the right wall, the back wall, etc. Other embodiments may also have the user enter information related to where the room return 22a and the room supply 24a are located. Of course, other questions and/or techniques for querying the user to provide the requisite room information 54 may also be used.

Again, once the room information 54 has been received, the method continues on to decision block 210. In this decision block, the system 40 determines whether it has received sufficient room information 54 from the user. Thus, if the system 40 determines that more or additional room information 54 is necessary, the method 200 will return to the receive room information step 208 as shown. This process will be repeated until the system 40 determines that the requisite room information 54 has been received.

Once the appropriate room information 54 has been received, the method 200 continues on to receive 212 information regarding the fitting (or in other words, fitting information 56). Again, as with some of the previous steps, embodiments may be constructed in which the system 40 queries the user and/or provides "fill-in-the-blank" questions that allow the user to readily supply the appropriate fitting information 56 to the user. For example, the system 40 may query the user regarding the size of the fitting, etc. Of course, other questions and/or techniques for extracting the fitting information 56 from the user may also be used.

Once the fitting information 56 has been received, the method 200 will then proceed to the decision block 214. The purpose of this decision block 214 is for the system 40 to determine whether additional fitting information 56 is necessary. If the system 40 determines that such additional fitting information is required, then the method 200 will return to the receive fitting information step 212. As shown in FIG. 8, this process will continue until the system 40 determines that no additional fitting information 56 is required.

It should be noted that the embodiment shown in FIG. 9 outlines a method in which the receive information steps 204, 208, 212 comprise distinct steps. Other embodiments may be constructed in which the order of the steps 204, 208, 212 are interchanged. Still further embodiments may be constructed in which one or more of the receive information steps 204, 208, 212 are omitted. Further, although the embodiment of FIG. 9 shows that the steps of receiving appliance information 204, receiving room information 208, and receiving fitting information 212 as separate steps, other embodiments may be constructed which combine one or more of these steps. For example, embodiments may be constructed in which appliance information is received at the same time as room information and/or fitting information. Other embodiments may be constructed in which room information is received at the same time as the appliance information and/or the fitting information, etc. Still further embodiments may be constructed in which all of the information is gathered simultaneously through a series of user inputs (such as user responses to "fill-in-the-blank" questions), etc.

After the decision block 214 determines that no additional fitting information 56 is necessary, embodiments of the present method 200 may be constructed in which the method proceeds to perform an information check step 216. In this step 216, the system 40 checks whether any of the information 46 supplied by the user is inaccurate or incompatible. If the information entered is compatible and does not appear to be inconsistent, then the method will proceed to the end step 218.

However, if the system determines (as part of the information check step 216) that some or all of the input information is inconsistent or incompatible with another piece of information, then this step 216 will return the user to the appliance information step 204 so that the user could enter the correct information. For example, if the user selected an HVAC unit that could not fit into the dimensions of the room (or could not, because of building codes, be used with this room/building, etc.), then, as part of the information check step 21.6, the system 40 would determine that the HVAC unit and the room are incompatible with each other. Accordingly, the system 40 would then alert the user of this incompatibility and would return the user to the appliance receive information step 204 so that the user could enter corrected information.

It should be noted that other embodiments may be constructed using additional "information check" steps 216. For example, embodiments may be constructed in which one or more information check steps 216 are included in the method 200 such as after the decision block 206 and/or after the decision block 210. Further embodiments may be constructed in which the information check step 216 does not return the user to the appliance information step 204 if the system 40 determines that there is an incompatibility in some of the entered information. Rather, in these embodiments, the information check step 216 will return the user to the receive room information step 208 or the receive fitting information step 212, as desired.

Referring still to FIG. 9, additional embodiments of the method 200 are also illustrated. In these embodiments, the method 200 does not proceed to the information check step 216 after the decision block 214. Instead, in these embodiments, the method 200 proceeds to the additional information decision block 220. In the decision block 220, the system 40 determines whether any additional information regarding the duct work is needed. Such additional information may involve information regarding the user, the building, or any topic that the user wants to submit.

If the system 40 determines that no additional information is necessary in the decision block 220, then these embodiments of the method 200 will proceed to the information check step 216, as shown. However, if the decision block 220 determines that some additional information is required, the method will proceed to the step 222 of receiving additional information from the user. Once this additional information is received, these embodiments of the method 220 will return to the decision block 220, which will once again make an assessment of whether additional information is required. This process will be repeated until the decision block 220 is satisfied that all the information has been entered and has the method proceed to the information check step 216.

Figure 10:
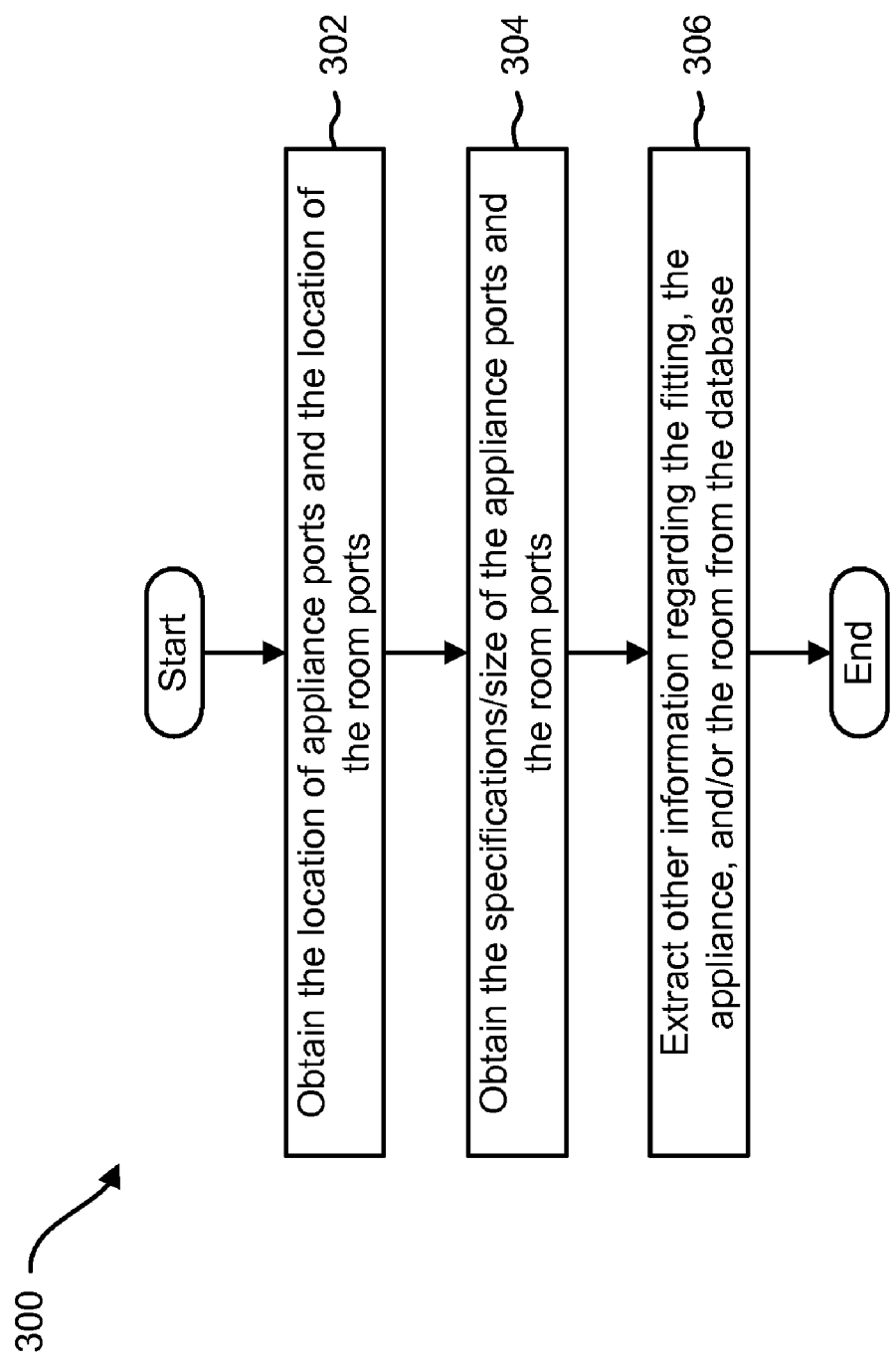
FIG. 10 is a flow diagram of an embodiment of a method for processing information using the database that may be used in conjunction with one of the steps of the method shown in FIG. 8.

FIG. 10 is a flow diagram that illustrates one embodiment of a method 300 by which the system 40 may process the information that has been input into the system 40. This method 300 may be used, in whole or in part, as the processing the information step 104 of the method 100 shown in FIG. 8.

The method 300 may begin by obtaining 302 the location of the appliance ports and the location of the room ports 302. (Again the term "appliance ports" refer to either the appliance supply 23 or the appliance return 21 whereas the term "room ports" refers to either the room supply 24*a* or the room return 21*a*.) If information regarding the location of the room port(s) or the appliance port(s) was directly input to the system 40 as part of the input information 40, then the obtaining step 302 may comprise verifying that this information was actually input. Other embodiments may be constructed in which the obtaining step 302 comprises extracting the locations of the room ports and the appliance ports out of the input information 46.

As noted above, other embodiments may be constructed in which the system 40 will calculate the "relative" locations of the room ports and the appliance ports with respect to the interior of the room. In these embodiments, the obtaining step 302 may comprise calculating the "relative" locations of the room ports and the appliance ports (in the manner described above).

Referring still to FIG. 10, additional embodiments of the method 300 may involve obtaining 304 the specifications of the appliance ports and the room ports. Again, if information regarding the size and/or specifications of the appliance ports and the room ports was directly input into the system 40 as part of the input information 46, the obtaining step 304 may comprise extracting this information from the information 46 and/or verifying that this information has been input into the system 40. Likewise, in other embodiments, this obtaining step 304 may comprise searching the database 89 for the requisite size/specification information and/or calculating the requisite size/specification information from other input data.

Additional embodiments may have the method 300 (optionally) extract 306 other information regarding the fitting, the appliance, and/or the room from the database 89. Specifically, if the system 40 determines that other information pertaining to the fitting, the appliance, and/or the room is needed and/or desirable, the system 40 may, as described above in conjunction with FIG. 6, search the database 89 and/or extract such information as needed. This extracted information may then be used by the system 40 to make the appropriate duct work design 42.

Figure 11:
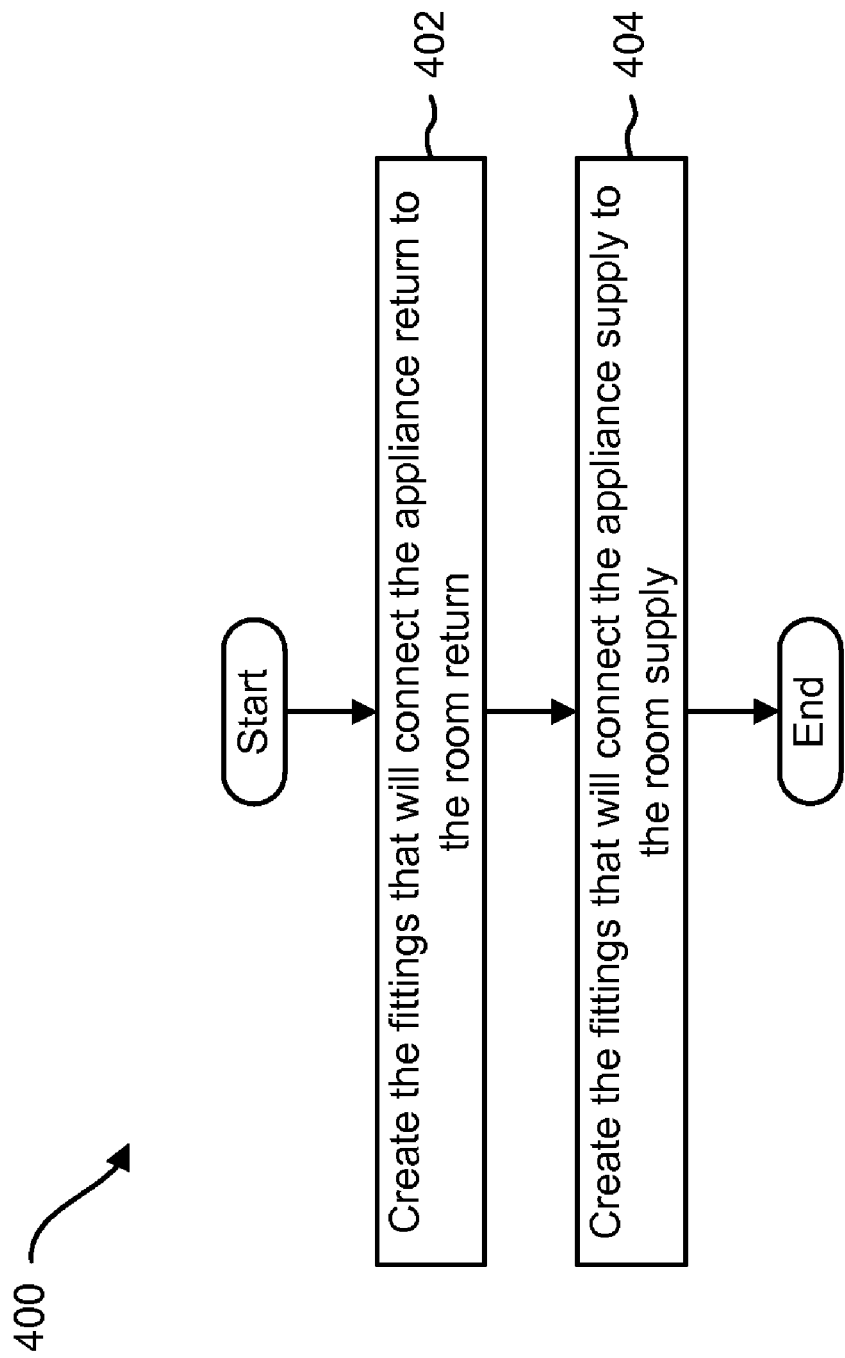
FIG. 11 is a flow diagram of another embodiment of creating a duct work design that may be used in conjunction with one of the steps of the method shown in FIG. 8.

FIG. 11 is a flow diagram that illustrates one possible order in which the creating step 106 (shown in FIG. 8) may be accomplished. Specifically, as shown in FIG. 11, when the creating step 106 undertakes to create the fittings, the system 40 may first create 402 the fitting(s) that will connect the appliance return 21 to the room return 22a. However, once these "return" fittings have been created, the system 40 may then proceed to create 404 the fitting(s) that connect the appliance supply 23 to the room supply 24a.

It should be noted, however, that the order of the "creating" steps 402, 404 that is shown in FIG. 11 could vary depending upon the particular embodiment. For example, embodiments may also be made in which the system 40 creates the fitting(s) that connect the appliance supply 23 to the room supply 24a, and then, once this step is completed, the system 40 will then create the fitting(s) that connect the appliance return 21 to the room return 22a. Still further embodiments may be constructed in which the fitting(s) that connect the appliance return 21 to the room return 22a are created at the same time as the fittings that connect the appliance supply 23 to the room supply 24a Referring now to FIG. 12, a method 500 is illustrated for creating a duct work design 42 using processed information and a fitting factory 48. This method 500 may be used, either in whole or in part, as the creating step 106 in the method 100 described above in FIG. 8.

In order to create a duct work design 42, the method 500 starts or begins 501a collection of the fittings that will be constructed. In general, this collection will be the list of fittings that are necessary to connect the appliance port to the room port. Accordingly, in many embodiments, starting 501 or beginning 501a list may include adding the location of the appliance port to the list as a reference ("starting") point.

Once the list has begun, the next step may involve determining 502 which fitting needs to be added. This determination is usually accomplished using the "rules" or protocols programmed into the system 40. (A typical of the embodiment of the rules will be described in FIG. 13.) These rules will determine which fitting needs to be created and/or added to connect the appliance port to the room port.

If the system 40 is attempting to connect the appliance return 21 to the room return 22a, the system 40 will have already received and/or processed information regarding the location of the appliance return 21 and the room return 22a. Using this information 46, the system 40 may then determine, using the rules, which is the first fitting 20 (or piece of duct work) that needs to be created in order to link the appliance return 21 to the room return 22a. Usually, this will involve determining the specifications of the particular fitting 20—i.e., how long will the fitting be, what is the fitting's diameter, is the fitting straight, curved, etc.

Once the specifications for this particular fitting have been determined, the method 500 continues by requesting 504 the fitting from the fitting factory 48. Specifically, the system 40 will communicate with the factory 48 and will send inputs to the fitting factory 48 regarding the required specifications of the desired fitting (i.e., the length of the fitting, the diameter of the fitting, etc.). Once the factory 48 has received these input specifications, the fitting factory 48 may then, as was described above in conjunction with FIG. 7, search its database/system to find which fitting in the system 48 most closely matches the input specifications.

After the factory 48 has found the fitting that most closely resembles the input specifications, the system 40 will receive 506 a communication from the matching algorithm 96 that details this fitting. Once this communication has been received 506, the information regarding this new fitting is then added 508 to the collection.

After this new fitting has been added to the collection, the system 40 will then evaluate 510 how the addition of the fitting has changed the collection. In general, this will involve examining the new position of the "opening" or in other words, the location where the next fitting in the sequence will attach. For example, when the collection is begun, the first "opening" is the appliance port itself in that this is the point where the first fitting will attach. However, when the first fitting is attached, this fitting will move the location of the opening according to the shape/specifications of the fitting. If the fitting is a "straight" fitting that is three (3) feet in length, then the attachment of this fitting to the appliance port will be such that the opening (or point of attachment for the next fitting) will be moved 3 (three) feet—i.e., the length of the added fitting. Thus, once this new fitting has been added, the system 40 must then evaluate 510 how this fitting has changed the collection, or in other words, where the location of the opening is after this change.

Figure 12:
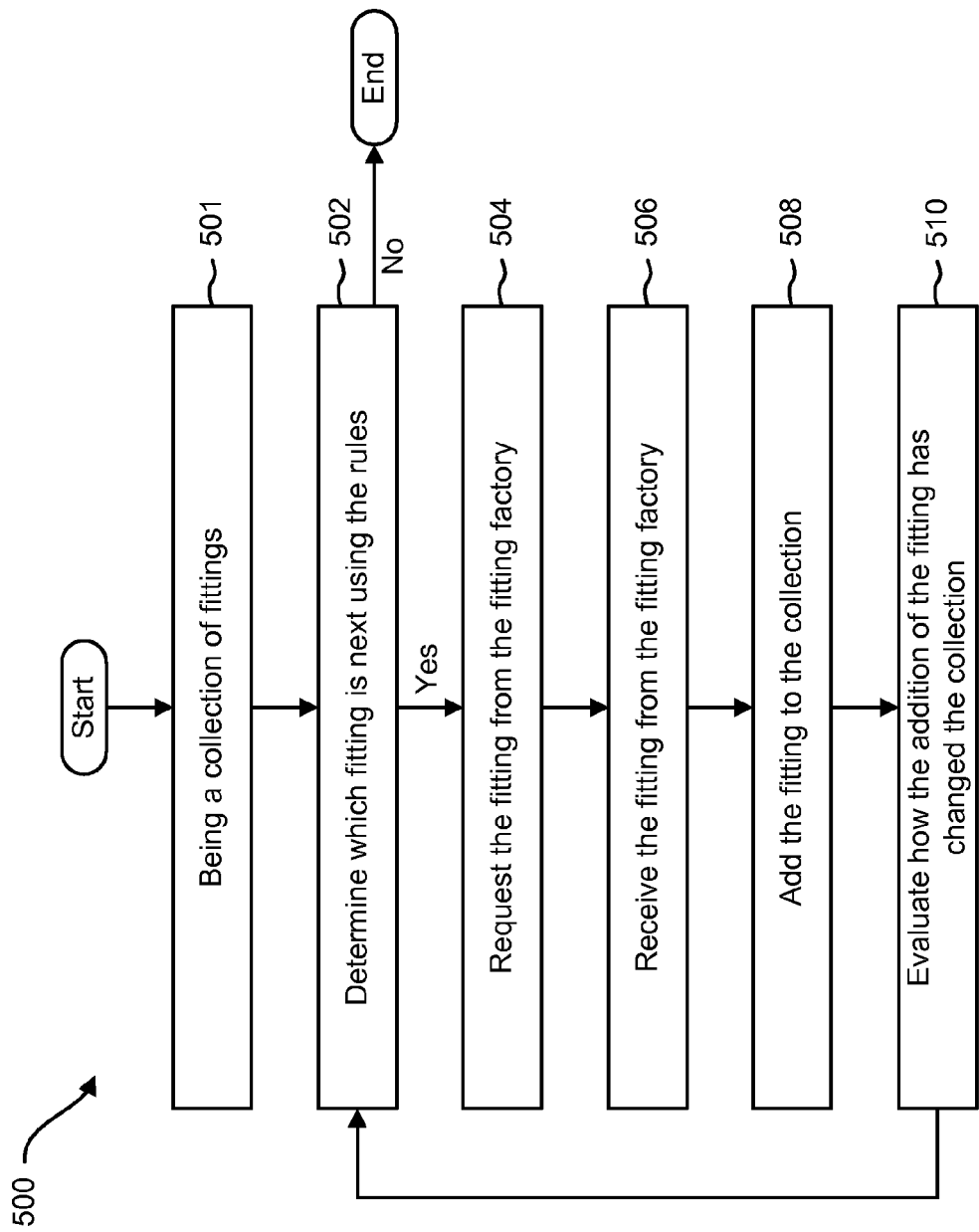
FIG. 12 is a flow diagram of an embodiment of creating a duct work design that may be used in conjunction with one of the steps of the method shown in FIG. 8.

Once the evaluating step 510 has been completed, the method 500 will return to determine which fitting is next step (i.e., step 502). Of course, if the system 40 determines that no additional fittings are needed, then the method 500 will end. However, if the system 40 determines 502 that an additional fitting is necessary—i.e., another fitting is needed in the collection in order to connect the appliance port of the room port—then the steps, as shown in FIG. 12, will be repeated. These steps 502-510 will be repeated until the system 40 determines 502 that no additional fittings are needed—e.g., the fittings in the collection are sufficient to connect the appliance port to the room port.

Figure 13:
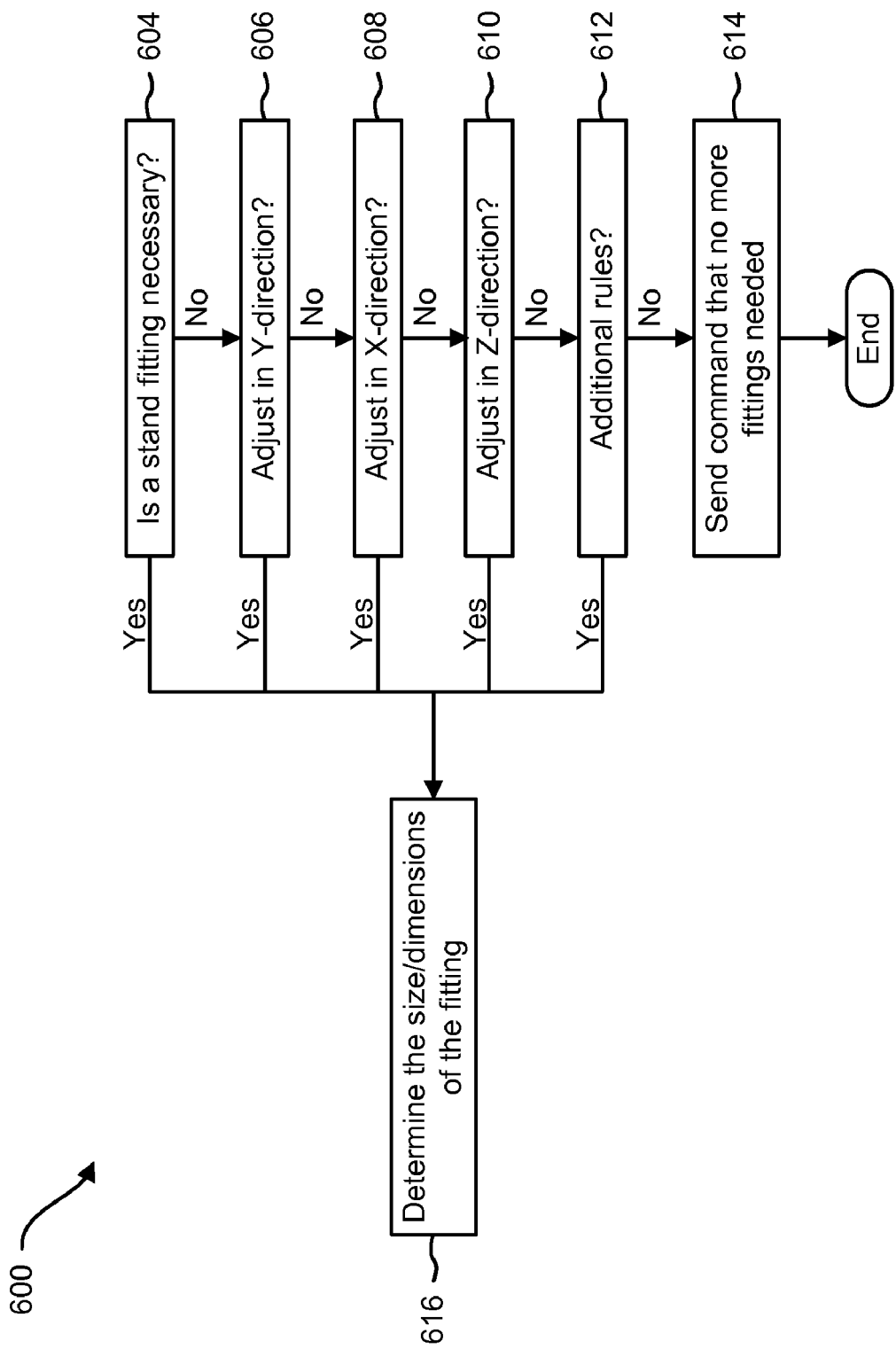
FIG. 13 is a flow diagram showing one embodiment of the "rules" that the system will use as part of the method of FIG. 12.

Referring now to FIG. 13, a method 600 is shown that illustrates the rules that the system 40 may use to determine the next fitting that is necessary to create the duct work design 42. As noted above in FIG. 12, one of the steps of the method 500 is for the system 40 to determine (in step 502) the next fitting based upon a series of rules. As used herein, the term "rules" refers to guidelines or constraints that the system 40 will use in order to determine the next fitting that should be added. Accordingly, the method 600 represents one embodiment of set of rules that will govern the system 40 in its determination of the next appropriate fitting.

The method 600 begins as shown in FIG. 13 with the step of evaluating 604 whether a stand fitting is necessary. The reason for this "stand" is that, in some embodiments, the appliance return 21 and/or the appliance supply 23 are positioned on the bottom of the HVAC unit 12, and thus, in order for fittings to connect to these appliance ports, the HVAC unit 12 must be raised off of the ground. Accordingly, a "stand" fitting is a fitting 20 that will run from the appliance return 21/appliance supply 23 along the side of the HVAC unit 12 until it terminates at the top edge of the unit 12. (In some embodiments, the function of the "stand" fitting is to move the appliance return 21/appliance supply 23 from the bottom of the HVAC unit 12 to the top of the unit 12, such as for example, if the HVAC unit 12 needs to be placed on a pedestal, a ledge, a shelf, etc., such that the bottom of the HVAC unit 12 does not rest upon the floor of the building.)

If the system 40 determines (in step 604) that a stand fitting is necessary, the method 600 will proceed to the step of determining 616 the size and/or dimensions of the fitting. In this step 616, the system 40 will calculate the actual size and specifications of the fitting—i.e., how long does the fitting have to be, what is the diameter of the fitting, is the diameter constant, what changes in the diameter of the fitting are necessary, where (along the length of the fitting) should the diameter of the fitting be changed, etc. Of course, once the system 40 has determined the size/specifications of the fitting, these specifications may then be sent to the fitting factory 48 (as described above) so that the factory 48 may, in the manner described above, determine which of the fittings in the factory 48 most closely matches these determined specifications.

On the other hand, if the system 40 determines that a stand fitting is not necessary (or that the stand fitting is already in place), then the method 600 will continue on to the step of adjusting 606 in the Y-direction. (The "Y-direction" is generally used to refer to the vertical direction.) Thus, the adjusting 606 in the Y-direction means that the system 40 will first calculate the fitting(s) that are needed to compensate for the height difference between the HVAC unit 12 and the room port. Because the room port is generally located in the ceiling, this adjustment 606 in the Y-direction will usually comprise determining the fitting(s) needed to run from the HVAC unit 12 to the ceiling.

There are, of course, a variety of different adjustments that may be made in the Y-direction using fittings. The most common of these "adjustments" is that which is described above—i.e., the fittings that run between the HVAC unit 12 and the room port to compensate for the differences in height. However, other adjustments may require changing the axis for the Y-direction. Further adjustments may involve changing the size, diameter, or other dimensions of the fittings so that the fittings will connect to the room port and/or the HVAC unit 12.

If the system 40 determines 606 that an adjustment in the Y-direction is necessary, the method 600 will proceed to the step of determining 616 the size and/or dimensions of the fitting(s), as described above. On the other hand, if the system 40 determines that an adjustment in the Y-direction is not necessary (or that such Y-direction adjustment has already been performed), then the method 600 will continue on to the step of adjusting 608 in the X-direction.

The step of adjusting 608 in the X-direction is similar to the previous step except that instead of adjusting in the vertical direction (the Y-direction), the adjustment is being calculated for the X-direction—i.e., the differences in the horizontal position between the HVAC unit 12 and the room port. Thus, this step 608 will involve calculating the fitting(s) in the duct work design 42 that will run horizontally. Any of the other possible adjustments discussed above may also be used in the X-direction (such as changing the size/diameter of the fittings, etc.). If the system 40 determines that adjustment in the X-direction is necessary, the method 600 will proceed to the step of determining 616 the size and/or dimensions of the fitting(s), as described above.

However, if the system 40 determines that adjustment in the X-direction is not necessary (or that such X-direction adjustment has already been performed), then the method 600 will continue on to the step of adjusting 610 in the Z-direction. The "Z-direction" is defined to be the transverse or "depth" direction. Thus, the step of adjusting 610 in the Z-direction means calculating the fitting(s) that will run in the transverse direction that are necessary to ultimately connect the room port of the HVAC unit 12. Any of the other possible adjustments discussed above may also be used in the Z-direction (such as changing the size/diameter of the fittings, etc.). Again, if the system 40 determines that adjustment in the Z-direction is necessary, the method 600 will proceed to the step of determining 616 the size and/or dimensions of the fitting(s).

However, if no adjustment in the Z-direction is necessary (or if this Z-direction adjustment has already been performed), then the method 600 may continue to the step of adjusting 612 according to any additional rules. This step 612 allows the user to program or determine other rules for the system 40 according to his or her preferences and/or the other factors, such as the size of the room, any obstacles that may exist in the room that will affect the duct work design 42, etc. If such adjustment based on these additional rules 612 is necessary, the method 600 will proceed to determine the size/specifications step 616. On the other hand, if no additional changes are necessary, the method 600 will send 614 the command that no further fittings are necessary. This step 614 effectively informs the system 40 that the duct work design 42 is completed and that no more fittings are needed to connect the HVAC unit 12 to the room port.

It should be noted that the method 600 is only one possible embodiment of the steps by which the system 40 determines which fitting should be used to connect the HVAC unit 12 to the room port. Other embodiments may also be used. For example, embodiments may be used in which one or more of the steps shown in the FIG. 13 are omitted. Specifically, embodiments may be used in which the stand fitting step 604, the additional rules step 612, and/or other step(s) are omitted.

Further embodiments may be used in which the order of the steps differs from that which is shown in FIG. 13. Particularly, embodiments may be used in which the additional rules step 612 is performed in a different order from that which is shown. Additional embodiments may adjust the X-direction and/or the Z-direction prior to the adjustments in the Y-direction.

It should also be noted that embodiments may also be used in which the system 40 will begin adjusting in the X-direction or the Z-direction prior to completely adjusting in the Y-direction. For example, if the desired total adjustment in the Y-direction is 5 feet, some embodiments may be used in which one fitting that is five feet long is used to make this Y-direction adjustment prior to any adjustment in the Z-direction or the X-direction. However, instead of adjusting 5 feet in the Y-direction all at once, other embodiments may also be used in which one fitting is used to adjust only 3 feet in the Y-direction and then adjustment in the X-direction and/or the Z-direction will occur prior to creating the fitting that will make the final 2 feet adjustment in the Y-direction. Similar iterations and/or ways of adjusting may, of course, be used in conjunction with the X-dimension or the Z-dimension. In fact, any possible way of adjusting the X, Y, or Z-direction, in any order, may be used depending on the particular embodiment and the particular facts/circumstances of the situation.

Figure 14:
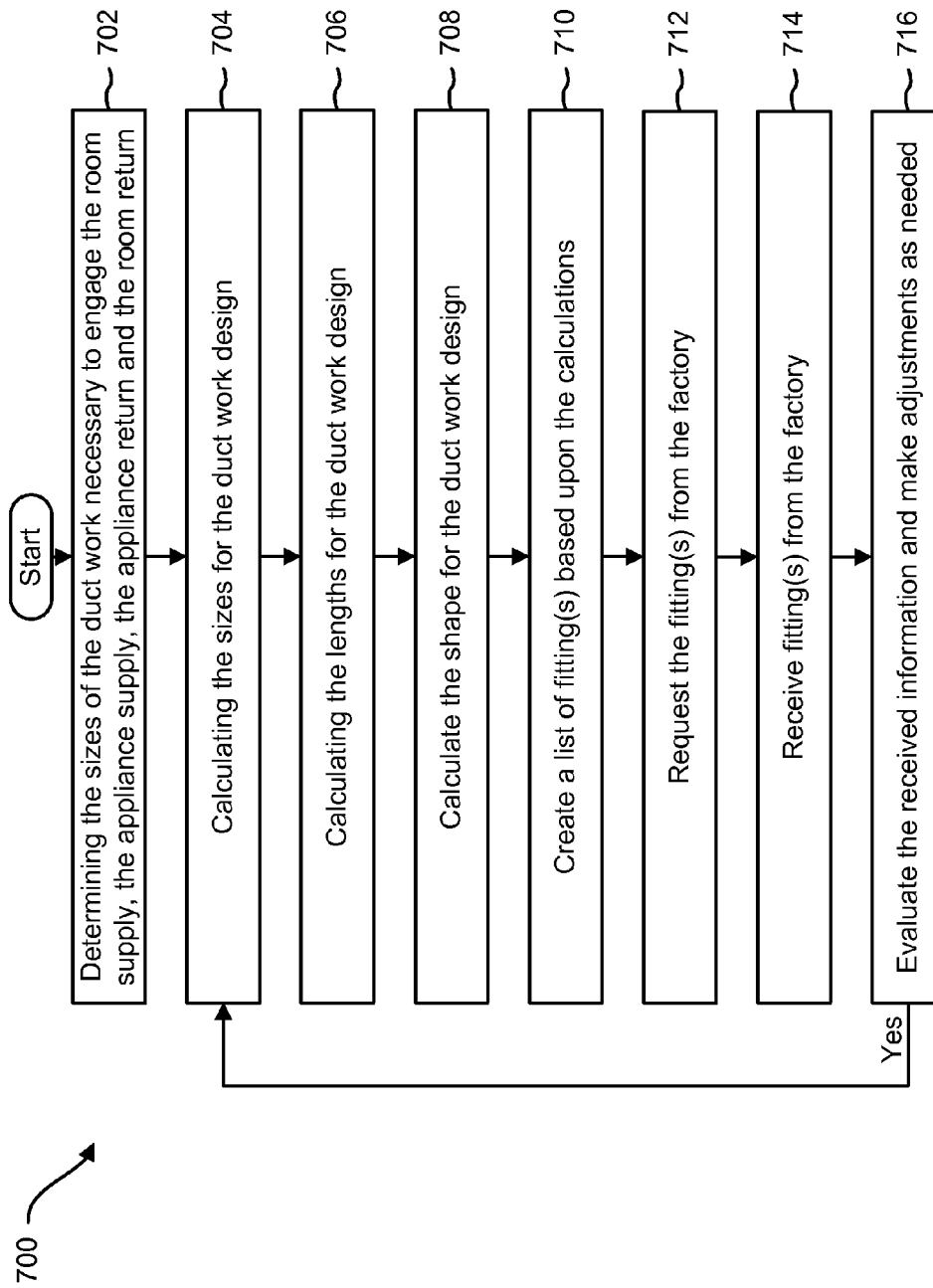
FIG. 14 is a flow diagram of another embodiment of creating a duct work design that may be used in conjunction with one of the steps of the method shown in FIG. 8.

Referring now to FIG. 14, a flow diagram illustrates another method 700 for creating a duct work design 42 using processed information and a fitting factory 48. Like the method shown above in conjunction with FIG. 12, the method 700 may be used, either in whole or in part, as part of creating 106 a duct work design step shown above in FIG. 8.

The method 700 begins with the step of determining 702 the sizes of the duct work 20 Specifically, this determining step 402 involves determining the specific sizes of the openings/ports (including all three-dimensions) of the appliance supply 23, the appliance return 21, the room return 22a, and the room supply 24a. In general, such information will be readily available in that it will have been input into the system 40 as part of the appliance information 52.

Once the method 700 has determined the appropriate sizes of the supply openings and return openings, the method will then calculate the sizes 704, the lengths 706, and the shapes 708 (including the angles, etc.) of the duct work 20. The order in which such calculation steps are done may change according to specific embodiments. These calculations are similar to the type of calculations that are presently preformed by HVAC professionals. Accordingly, these types of calculations may be implemented in a variety of different ways.

Once the calculation steps 704, 706, 708 steps have been concluded, the method 400 will then create 710 a list of one or more fittings that needed to connect the HVAC unit 12 to the room port. In some embodiments, this list may include all of the fittings that will ultimately be used. However, in other embodiments, this list may only include the first fitting that will be added. (In these latter embodiments, the method 700 will, as explained below, be repeated until all of the fittings are ultimately found on the list).

After constructing the list, the system 40 will then request the fitting(s) 712 from the factory 48. This request, as well as the way(s) in which the factory 48 finds the appropriate fittings, are discussed above. The factory 48 will then return the specifications to the system 40, which information will be received in step 714. Once the information from the factory has been received, the system 40 will evaluate 716 the received information and determine if adjustments/corrections to the duct work design 42 are needed. If adjustments are needed, or if more fittings are required as part of the duct work design, the method will return to step 702 and the method will be repeated, as needed. Of course, if no adjustments are necessary, the method 700 will end.

Thus, as explained above, the present system 40 provides a method/way in which duct work 20 can be designed more easily than that which is previously known. It should also be noted that, as used herein, information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for designing duct work using a computer, the method comprising:

receiving input information, wherein the input information includes a manufacturer and model number of an appliance, a location of a room supply, a location of a room return, and dimensions of a room;

processing the information;

creating a duct work design using the processed information and a fitting factory; and outputting a two-dimensional cut-sheet containing the duct work design, wherein the duct work design is created without receiving user input of actual duct dimensions of the fitting being designed, wherein the computer that implements the method is remotely accessed by a client computer via a computer network, wherein the input information further comprises log-in information, appliance information, or room information, wherein the input information may be supplied by a user answering questions that are supplied by a system, further comprising the step of outputting a three-dimensional representation of the duct work design, the three-dimensional representation being displayed on an output device of the computer and being rotatable by the user, wherein the method for designing duct work is used to retrofit duct work in conjunction with an existing HVAC unit and an existing room, wherein the processing step comprises:

obtaining the location of appliance ports and room ports; and obtaining the specifications of the appliance ports and the room ports;

the processing step further comprising the step of extracting other information from a database, and wherein the creating step comprises:

calculating a size of one or more fittings;
calculating a length of the fittings;
calculating a shape of the fittings;
requesting the fittings from the factory;
receiving the fittings from the factory; and
evaluating and making adjustments to the duct work design based upon the information received from the factory.

* * * * *